United States Patent
Park

(10) Patent No.: US 9,904,651 B2
(45) Date of Patent: Feb. 27, 2018

(54) OPERATING METHOD OF CONTROLLER FOR SETTING LINK BETWEEN INTERFACES OF ELECTRONIC DEVICES, AND STORAGE DEVICE INCLUDING CONTROLLER

(71) Applicant: Hyuntae Park, Suwon-si (KR)

(72) Inventor: Hyuntae Park, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 230 days.

(21) Appl. No.: 14/812,318

(22) Filed: Jul. 29, 2015

(65) Prior Publication Data
US 2016/0034413 A1 Feb. 4, 2016

Related U.S. Application Data

(60) Provisional application No. 62/031,301, filed on Jul. 31, 2014.

(30) Foreign Application Priority Data

Oct. 13, 2014 (KR) .................. 10-2014-0137566

(51) Int. Cl.
*G06F 13/00* (2006.01)
*G06F 13/20* (2006.01)
*G06F 13/42* (2006.01)
*G06F 13/40* (2006.01)

(52) U.S. Cl.
CPC ...... *G06F 13/4265* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 5,185,736 A * | 2/1993 | Tyrrell | ...................... H04J 3/08 370/358 |
| 7,679,133 B2 | 3/2010 | Son et al. | |
| 8,301,822 B2 | 10/2012 | Pinto et al. | |
| 8,437,343 B1 | 5/2013 | Wagh et al. | |

(Continued)

FOREIGN PATENT DOCUMENTS

| WO | WO-2014/038223 A1 | 3/2014 |
|---|---|---|
| WO | WO-2014/108321 A1 | 7/2014 |

OTHER PUBLICATIONS

JEDEC Standard, "Universal Flash Storage (UFS) Host Controller Interface", JEDEC Solid State Technology Association, Aug. 2011.

(Continued)

*Primary Examiner* — Michael Sun
(74) *Attorney, Agent, or Firm* — Harness, Dickey & Pierce P.L.C.

(57) ABSTRACT

An operating method includes sensing a connection of the first electronic device to an interface circuit of the second electronic device; receiving an identification code from the first electronic device; and setting a state of the interface circuit as an express linkup state corresponding to the received identification code. The identification code has a value different from values defined and reserved in an interface protocol which defines an operating procedure of the interface circuit. The value of the identification code varies with an attribute of the first electronic device.

19 Claims, 17 Drawing Sheets

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,621,128 B2 | 12/2013 | Radulescu et al. |
| 8,654,587 B2 | 2/2014 | Yoon et al. |
| 8,782,336 B2 | 7/2014 | Sutardja et al. |
| 2011/0233648 A1 | 9/2011 | Seol et al. |
| 2012/0089854 A1* | 4/2012 | Breakstone .............. G06F 1/30 713/323 |
| 2013/0097460 A1 | 4/2013 | Jeong et al. |
| 2014/0012961 A1 | 1/2014 | Pope |
| 2014/0075102 A1 | 3/2014 | Oh et al. |
| 2014/0089553 A1* | 3/2014 | Ma ..................... G06F 13/4045 710/314 |
| 2014/0109240 A1 | 4/2014 | Pomerantz et al. |

OTHER PUBLICATIONS

Yuping Chung, "UFS PHY & UniPro®", Taiwan Mobile Memory Workshop, Oct. 12, 2011.

\* cited by examiner

FIG. 6

| Device | ID_CODE | Linkup Information |
|--------|---------|--------------------|
| A | 0xA1 | Tx 1-2, Rx 1, 3Gbps, LS PWM G4,··· |
| B | 0xA2 | Tx 1, Rx 1, 1.5Gbps, LS PWM G1,··· |
| C | 0xA4 | – |

⋮

OPERATING METHOD OF CONTROLLER FOR SETTING LINK BETWEEN INTERFACES OF ELECTRONIC DEVICES, AND STORAGE DEVICE INCLUDING CONTROLLER

CROSS-REFERENCE TO RELATED APPLICATIONS

The present application claims priority under 35 U.S.C. § 119 to U.S. Provisional Application No. 62/031,301 filed on Jul. 31, 2014, and Korean Patent Application No. 10-2014-0137566 filed on Oct. 13, 2014, the entire contents of both of which are incorporated herein by reference.

BACKGROUND

1. Field

Example embodiments relate to interfacing. For example, at least some example embodiments relate to an interface method for link startup between electronic devices using a high-speed serial interface and/or a controller and an electronic device operating according to the interface method.

2. Description of the Related Art

An electronic device may independently perform a function. In addition, the electronic device may perform a function with the assistance of other electronic devices by exchanging data with the other electronic devices. Interfacing is used to exchange data between these electronic devices. As various types of electronic devices are developed, types of interface protocols also become various. Recently, Mobile Industry Processor Interface (MIPI) Alliance proposes the interface protocol using "UniPro" as a link layer to standardize an interface process of a mobile device.

The UniPro supports a physical layer called "PHY". An electronic device that performs interfacing by means of UniPro and PHY includes a transmitter and a receiver which are used to exchange data with another electronic device. A transmitter included in a first electronic device, and a receiver included in a second electronic device connected to the first electronic device, may constitute one "lane", which is used to transfer data. However, the numbers of transmitters and receivers included in the first electronic device may be different from those in the second electronic device. In addition, the "capability" of the first electronic device may be different from that of the second electronic device.

Accordingly, each of two electronic devices may perform a "link startup" process before exchanging data to recognize a physically connected lane and to receive information associated with the capability of the other electronic device. During the link startup process, the two electronic devices may exchange and recognize information associated with the numbers of transmitters and receivers, physically connected lanes, and the capability of the opposite device. After the completion of the link startup process, the two electronic devices may switch to a "linkup state" in which the two electronic devices may stably exchange data.

The link startup process may be performed during an initialization operation performed when an electronic device is firstly used or during a booting operation of an electronic device. In addition, the link startup process may be performed during an operation for recovering an error of a linkup state. However, because a relatively large amount of information associated with two electronic devices is exchanged during the link startup process, the link startup process may take a long period of time. Due to the time required for the electronic devices to complete the link startup process, the performance of the electronic devices may degrade.

SUMMARY

Some example embodiments are related to an operating method of a controller configured to manage a second electronic device, the second electronic device being configured to communicate with a first electronic device.

In some example embodiments, the operating method may include sensing a connection of the first electronic device to an interface circuit of the second electronic device; receiving an identification code from the first electronic device after the connection of the first electronic device is sensed, the identification code having a value different from values defined and reserved in an interface protocol which defines an operating procedure of the interface circuit, the value of the identification code varying with an attribute of the first electronic device; and setting a state of the interface circuit as an express linkup state corresponding to the received identification code in order to enable a data communication with the first electronic device.

Some example embodiments are related to an operating method of a controller configured to manage a first electronic device.

In some example embodiments, the operating method may include sensing a connection of a second electronic device to an interface circuit of the first electronic device; providing an identification code to the second electronic device after the connection of the second electronic device is sensed, the identification code having a value different from values defined and reserved in an interface protocol which defines an operating procedure of the interface circuit, the value of the identification code varying with an attribute of the first electronic device; waiting for transferring of a response signal corresponding to the provided identification code from the second electronic device during a stand-by time; and in response to receiving the response signal from the second electronic device within the stand-by time, setting a state of the interface circuit as an express linkup state corresponding to the received response signal in order to enable a data communication with the second electronic device.

Some example embodiments are related to a storage device including a nonvolatile memory, an interface circuit, and a controller.

In some example embodiments, the nonvolatile memory may be configured to store one or more identification codes, the one or more identification codes having different values depending on attributes of hosts. The interface circuit may be configured to exchange data with a host in compliance with an interface protocol using a physical layer and a link layer. The controller may be configured to receive an identification code corresponding to an attribute of the host when a connection of the host to the interface circuit is sensed, and to provide a response signal corresponding to the received identification code to the connected host. One of the controller and the link layer may include a determination circuit configured to determine whether an identification code having a value identical to a value of the received identification code is stored in the nonvolatile memory; and a state setting circuit configured to set states of the physical layer and the link layer as an express linkup state corresponding to the received identification code in order to enable a data communication with the connected host.

Some example embodiments relate to a controller associated with a first electronic device, the first electronic device including a first interface circuit configured to interface with second electronic devices and a nonvolatile memory.

In some example embodiments, the controller includes a processor and a memory, the memory containing computer readable code that, when executed by the processor, configures the controller to establish a connection with a respective one of the second electronic devices by, determining if attributes of the respective second electronic device are stored in the nonvolatile memory, configuring a physical layer of the first interface circuit based on the attributes, if the determining determines that the attributes are stored in the memory, and establishing a data connection over the connection from the first interface circuit to the respective second electronic device.

BRIEF DESCRIPTION OF THE DRAWINGS

The above and other objects and features will become apparent from the following description with reference to the following figures, wherein like reference numerals refer to like parts throughout the various figures unless otherwise specified, and wherein:

FIG. 6 is a table for describing an identification code and linkup information according to an example embodiment;

DETAILED DESCRIPTION OF EMBODIMENTS

Figure 1:
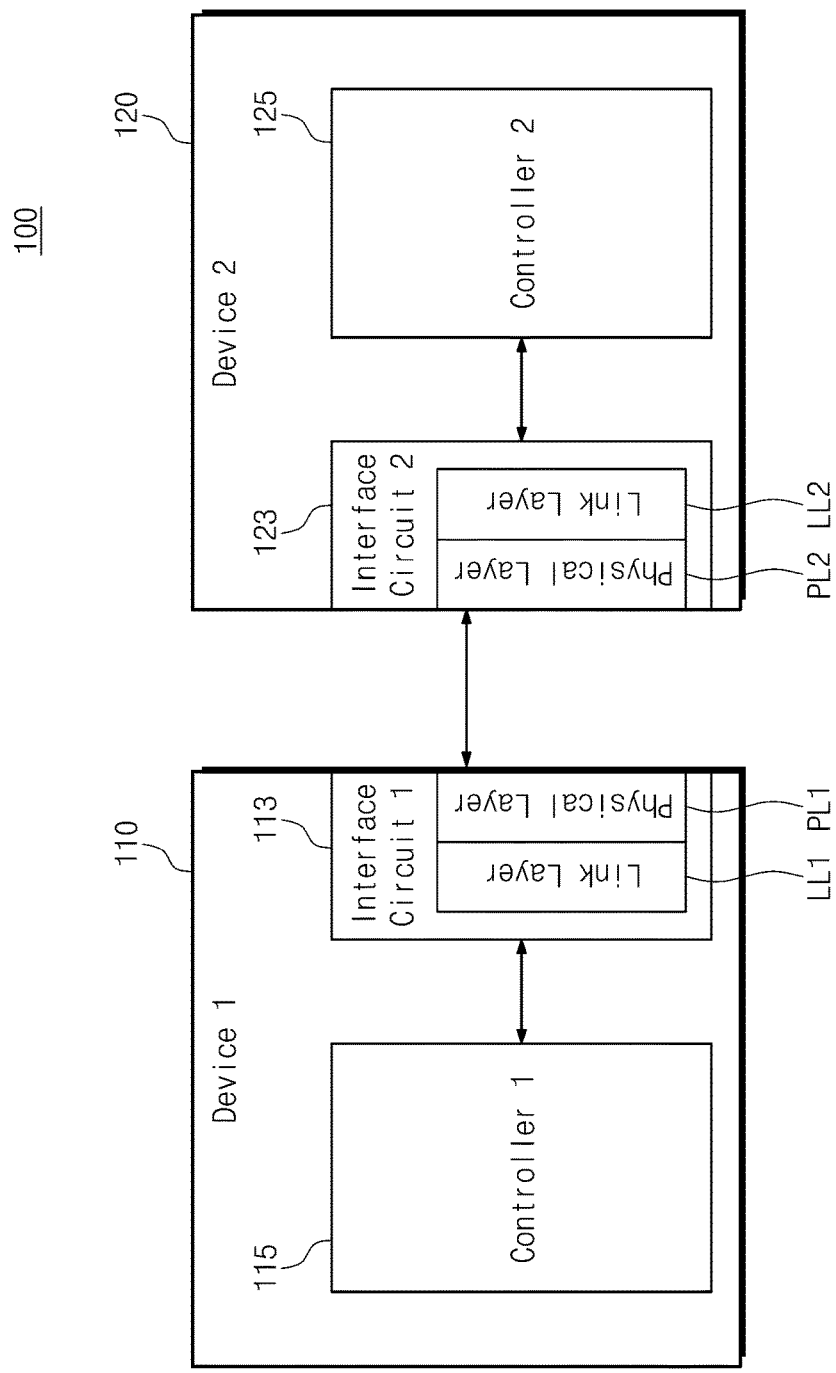
FIG. 1 is a block diagram illustrating an electronic system including two electronic devices which are connected to each other.

Example embodiments will be described in detail with reference to the accompanying drawings. Example embodiments, however, may be embodied in various different forms, and should not be construed as being limited only to the illustrated example embodiments. Rather, these example embodiments are provided as examples so that this disclosure will be thorough and complete, and will fully convey the concept of the example embodiments to those skilled in the art. Accordingly, known processes, elements, and techniques are not described with respect to some of the example embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the example embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which the example embodiments belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating an electronic system including two electronic devices which are connected to each other.

Referring to FIG. 1, an electronic system 100 may include a first electronic device 110 and a second electronic device 120.

The first electronic device 110 may include a first interface circuit 113 and a first controller 115. The second electronic device 120 may include a second interface circuit 123 and a second controller 125. However, each of the first electronic device 110 and the second electronic device 120 may further include other components not shown in FIG. 1.

In some example embodiments, the first electronic device 110 may be a host. For instance, when the electronic system 100 is a mobile electronic system, the first electronic device 110 may include an application processor. In some example embodiments, the second electronic device 120 may be a storage device.

However, example embodiments are not limited to the above-described example embodiments. For instance, a function and a configuration of the first electronic device 110 and a function and a configuration of the second electronic device 120 may be exchanged. In addition, the first electronic device 110 and the second electronic device 110 and 120 may be different types of electronic devices from each other. For instance, the second electronic device 120 may be a display device, an image processor, or a radio frequency (RF) communication chip. However, example embodiments are not limited thereto.

The first electronic device 110 may be connected with the second electronic device 120 through the first interface circuit 113. The first electronic device 110 may exchange data with the second electronic device 120 through the first interface circuit 120.

The first interface circuit 113 may include a first physical layer PL1 and a first link layer LL1. The physical layer PL1 may include physical components for exchanging data with the second electronic device 120. For instance, the first physical layer PL1 may include one or more transmitters and one or more receivers for exchanging data with the second electronic device 120. The first link layer LL1 may manage transmission and composition of data. In addition, the first link layer LL1 may manage integrity and error of data.

As an example embodiment, when the electronic system 100 is a mobile electronic system, the first link layer LL1 may be defined by a "UniPro" specification, and the first physical layer PL1 may be defined by an "M-PHY" specification. The UniPro and the M-PHY are interface protocols proposed by a mobile industry processor interface (MIPI) alliance. The first link layer LL1 of the first interface circuit 113 may include a physical adapted layer (not shown). The physical adapted layer may control the first physical layer PL1 (i.e., managing symbols of data, managing power, and so on).

However, example embodiments are not limited thereto. As will be described later, example embodiments may be applied to all interface circuits that include a physical layer and a link layer.

The first controller 115 may manage and control overall operations of the first electronic device 110. For example, the first controller 115 may process and manage data that is exchanged through the first interface circuit 113. The first electronic device 110 may function independently according to a control of the first controller 115.

The second electronic device 120 may be connected with the first electronic device 110 through the second interface circuit 123. The second electronic device 120 may exchange data with the first electronic device 110 through the second interface circuit 123.

The second interface circuit 123 may include a second physical layer PL2 and a second link layer LL2. The second physical layer PL2 may include physical components for exchanging data with the first electronic device 110. For instance, the second physical layer PL2 may include one or more transmitters and one or more receivers for exchanging data with the first electronic device 110. The second link layer LL2 may manage transmission and composition of data. In addition, the second link layer LL2 may manage integrity and error of data.

As an example embodiment, when the electronic system 100 is a mobile electronic system, the second link layer LL2 may be defined by the UniPro specification, and the second physical layer PL2 may be defined by the M-PHY specification. In this example embodiment, the second link layer LL2 of the second interface circuit 123 may include a physical adapted layer (not shown).

The second controller 125 may manage and control overall operations of the second electronic device 120. For example, the second controller 125 may process and manage data that is exchanged through the second interface circuit 123. The second electronic device 120 may function independently according to a control of the second controller 125.

As an example embodiment, when the second electronic device 120 is a storage device including a flash memory, the second controller 125 may operate in compliance with an interface protocol defined in an universal flash storage (UFS) specification proposed by a joint electron device engineering council (JEDEC). In this example embodiment, when the first electronic device 110 is a host, the first controller 115 may operate in compliance with an interface protocol defined in an UFS host controller interface (UFSHCI) specification. However, example embodiments are not limited thereto. As another example embodiment, when the second electronic device 120 is an image sensor, the second controller 125 may operate in compliance with an interface protocol called as a camera serial interface (CSI).

Example embodiments may be applied to all interface circuits including a physical layer and a link layer. A change or modification on example embodiments may be variously made according to an interfacing method.

Figure 2:
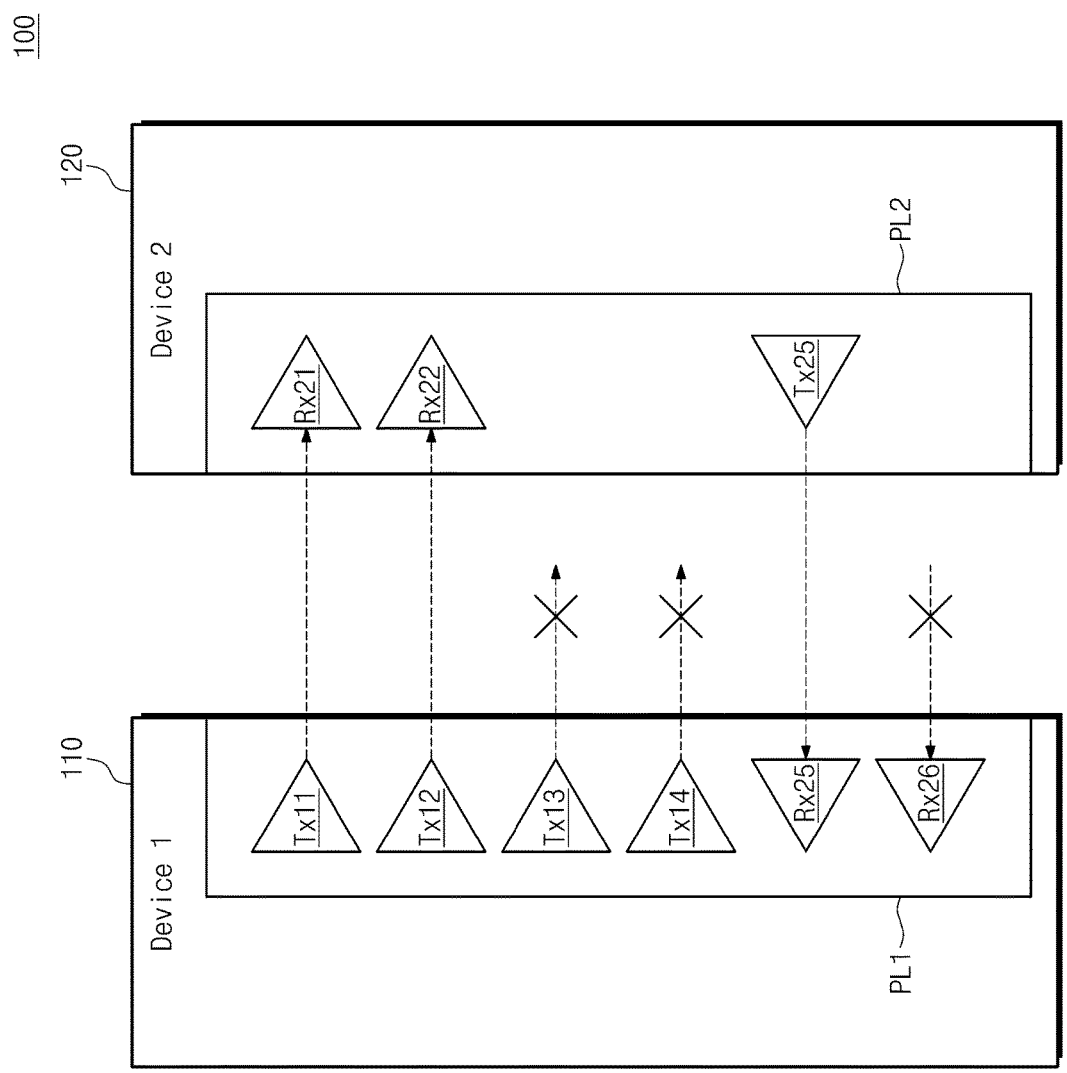
FIG. 2 is a conceptual diagram illustrating a connection between interface circuits of two electronic devices of FIG. 1.

FIG. 2 is a conceptual diagram illustrating a connection between interface circuits of two electronic devices of FIG. 1.

Referring to FIGS. 1 and 2, as described with reference to FIG. 1, an electronic system 100 may include the first electronic device 110 and the second electronic device 120 which are connected to each other. The first electronic device 110 may be connected with the second electronic device 120 through the first physical layer PL1 and the second electronic device 120 may be connected with the first electronic device 110 through the second physical layer PL2.

As illustrated in FIG. 2, the physical layer PL1 of the first electronic device 110 and the physical layer PL2 of the second electric device 120 may have a different number of transmitters Tx and/or Receivers Rx. For example, the first physical layer PL1 may include four transmitters Tx11 through Tx14 and two receivers Rx25 and Rx26. The second physical layer PL2 may include two receives Rx21 and Rx22 and one transmitter Tx25. However, example embodiments are not limited thereto. For instance, the numbers of transmitters and receivers included in each of the first physical layer PL1 and the second physical layer PL2 may be variously changed. A configuration illustrated in FIG. 2 is just an example to help understanding of the example embodiments.

When types of the first electronic device 110 and the second electronic device 120 are different from each other, the numbers of transmitters and receivers included in the first physical layer PL1 may be different from those included in the second physical layer PL2, as illustrated in FIG. 2. In addition, the capability (e.g., the transfer speed) of the first electronic device 110 may be different from that of the second electronic device 120. For instance, the maximum data transfer speed of the first electronic device 110 may be 6 gigabits per second (Gbps), while the maximum data transfer speed of the second electronic device 120 may be 3 Gbps.

When the configuration and the capability of the first electronic device 110 are different from those of the second electronic device 120, as the above instances, exchanging data between the first electronic device 110 and the second electronic device 120 may become unstable.

To stabilize the data exchange between the first electronic device 110 and the second electronic device 120, the first electronic device 110 and the second electronic device 120 may perform a "link startup" process before exchanging data. During the link startup process, the first electronic device 110 and the second electronic device 120 may exchange information associated with the number of transmitters, the number of receivers, the capability of device, and so on. With the link startup process, the first electronic device 110 may recognize the configuration and the capability of the second electronic device 120, and the second electronic device 120 may recognize the configuration and the capability of the first electronic device 110.

After the link startup process is completed, a state of each of the first electronic device 110 and the second electronic device 120 is set as a "linkup state" in which data may be exchanged stably. During the linkup state, certain ones of the transmitters Tx and receivers Rx may be connected to establish "lanes", while other ones of the transmitters and/or receivers Tx may be disabled such that they are not used to exchange data. Further, during the linkup state, the transmitters Tx and Receivers Rx in a lane may agree on a capability supported by both of the transmitters Tx and the Receiver Rx.

For instance, a first transmitter Tx11 of the first electronic device 110 and a first receiver Rx21 of the second electronic device 120 may constitute one lane. Further, a second transmitter Tx12 and a second receiver Rx22 may constitute one lane, and a fifth transmitter Rx25 and a fifth receiver Rx25 may constitute one lane. A third transmitter Tx13, a fourth transmitter Tx14, and a sixth receiver Rx26 that do not constitute any lane may not be used for exchanging data. However, connections between the transmitters and the receivers may be changed or modified differently from those illustrated in FIG. 2. The connections illustrated in FIG. 2 are just examples to help understanding of the example embodiments.

In addition, for instance, when the maximum data transfer speed of the first electronic device 110 is 6 Gbps and the maximum data transfer speed of the second electronic device 120 is 3 Gbps, the first electronic device 110 may exchange data with the second electronic device 120 at a speed of 3 Gbps maximally. Therefore, in this non-limiting example, at the linkup state, the first electronic device 110 may exchange data with the second electronic device 120 through three lanes at a speed of 3 Gbps maximally. When the linkup state is set, the first electronic device 110 may stably exchange data with the second electronic device 120. However, the link startup process requires exchanging a lot of information associated with the first electronic device 110 and the second electronic device 120. Accordingly, the link startup process may take a long time.

However, the link startup process may not be necessary when the first electronic device 110 and/or the second electronic device 120 are well known electronic devices. For instance, information associated with a configuration and capability of the first electronic device 110 and/or the second electronic device 120 may be well known when the first electronic device 110 and/or the second electronic device 120 are widely used electronic devices which are manufactured by well-known manufacturers. Alternatively, the electronic system 100 may have recognized, in advance, information associated with lanes connected between the first electronic device 110 and the second electronic device 120.

As an example embodiment, when information associated with a configuration and capability of the first electronic device 110 and information associated with connections of lanes are stored (or alternatively, pre-stored) in the second electronic device 120 and the second electronic device 120 can identify the first electronic device 110, the second electronic device 120 may skip the link startup process and may enter the linkup state based on the stored information. Therefore, in one or more example embodiments, the performance of the first electronic device 110 and/or the second electronic device 120 may be improved by skipping the link startup process.

Figure 3:
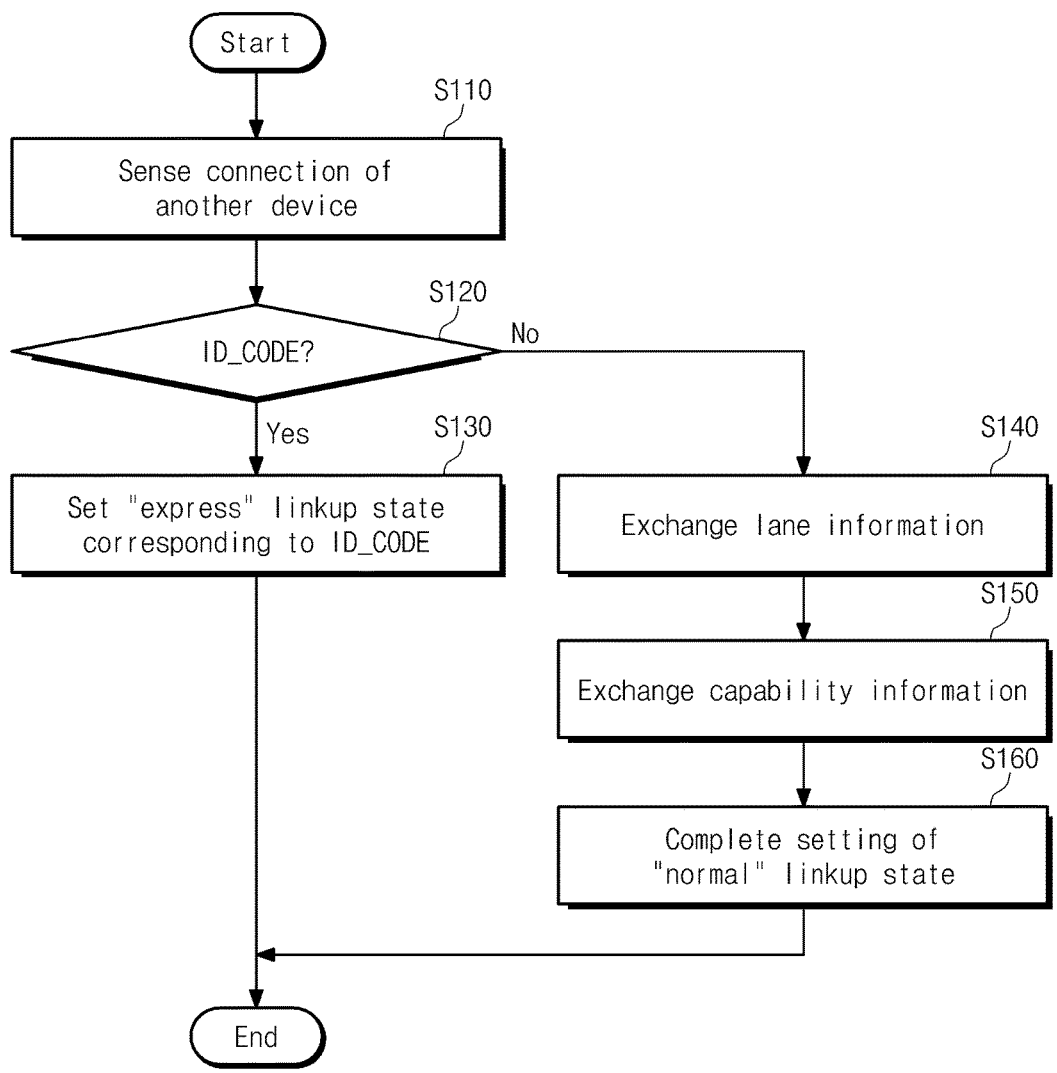
FIG. 3 is a flow chart describing setting of a linkup state according to an example embodiment.

FIG. 3 is a flow chart describing setting of a linkup state according to an example embodiment.

Referring to FIG. 3, a first electronic device 110 and/or a second electronic device 120 may operate according to operations described in FIG. 3.

In operation S110, one electronic device may sense a connection of another electronic device. For instance, the first electronic device 110 may be physically connected with the second electronic device 120 through the first interface circuit 113 (refer to FIG. 1). Further, the second electronic device 120 may be physically connected with the first electronic device 110 through the second interface circuit 123 (refer to FIG. 1). The first electronic device 110 may sense the connection of the second electronic device 120 through the first interface circuit 113, and the second electronic device 120 may sense the connection of the first electronic device 110 through the second interface circuit 123. As an example embodiment, operations that will be described with reference to FIG. 3 may be performed according to the first controller 115 (refer to FIG. 1) of the first electronic device 110 and/or the second controller 125 (refer to FIG. 1) of the second electronic device 120.

In operation S120, the first controller 115 and/or the second controller 125 may transfer an identification code ID_CODE between the two electronic devices that are connected to each other. For instance, the first electronic device 110 may provide the identification code ID_CODE to the second electronic device 120. In this instance, the first controller 115 may vary a value of the identification code ID_CODE with an attribute of the first electronic device 110. As an example embodiment, the value of the identification code ID_CODE may vary according to a type and/or a manufacturer of an electronic device. For instance, the second electronic device 120 may recognize an attribute of the first electronic device 110, based on the value the received identification code ID_CODE. As an example embodiment, the second electronic device 120 may recognize a type and a manufacturer of the first electronic device 110, based on the value of the received identification code ID_CODE.

The term "identification code" mentioned herein does not intend to limit the example embodiments. For instance, the "identification code" may be a binary bit string. Alternatively, the "identification code" may be a signal pattern. A format of the identification code may be variously changed or modified. As an example embodiment, the identification code ID_CODE may be transmitted in a manner similar to a "TRG_UPR" pattern that is defined by the UniPro and the M-PHY specifications.

In operation S130, when the first electronic device 110 and the second electronic device 120 adopt the identification code ID_CODE, each of the two electronic devices that are connected to each other may enter a linkup state. For instance, in operation S130, each of the first electronic device 110 and the second electronic device 120 may enter the linkup state corresponding to the identification code ID_CODE, for example.

For example, when the second electronic device 120 has previously stored a value of the identification code ID_CODE and can identify the first electronic device 110 based on the stored identification code ID_CODE, the second electronic device 120 may enter the linkup state. Alternatively, as another example embodiment, even if the second electronic device 120 have not stored the identification code ID_CODE, the second electronic device 120 may enter the linkup state. Detailed example embodiments will be described later.

As will be described with reference to FIGS. 4 through 12, the linkup state may be set without the link startup process that requires exchanging a large amount of information. Thus, according to the example embodiment, the linkup state may be rapidly set. The linkup state that is set according to an example embodiment may be referred to as an "express linkup state". The link startup process may be a type of handshaking procedure between the electronic devices 110, 120.

The first controller 115 and/or the second controller 125 may perform operations S140 through S160, when the first electronic device 110 and the second electronic device 120, respective do not adopt the identification code ID_CODE, respectively.

In operation S140, the two electronic devices 110, 120 that are connected to each other may exchange lane information. For instance, when the first electronic device 110 and the second electronic device 120 operate according to the UniPro and the M-PHY interface protocols, the two electronic devices 110, 120 may exchange lane information based on the patterns of TRG_UPR0, TRG_UPR1, and TRG_UPR2 which are defined by the specifications.

In operation S150, the two electronic devices 110, 120 that are connected to each other may exchange capability information. For instance, when the first electronic device 110 and the second electronic device 120 operate according to the UniPro and the M-PHY interface protocols, the two electronic devices 110, 120 may exchange capability information based on the functions of PACP_CAP_ind and PACP_CAP_EXT1_ind which are defined by the specifications.

In operation S160, each of the two electronic devices 110, 120 that are connected to each other may enter the linkup state. In particular, in operation S160, each of the first electronic device 110 and the second electronic device 120 may enter the linkup state, based on the lane information exchanged in operation S140 and the capability information exchanged in operation S150. In operations S140 through S160, the two electronic devices 110, 120 may exchange a relatively large amount of information to set the linkup state as compared to the information exchanged in operation S130. The linkup state set according to operations S140 through S160 may be referred to as a "normal linkup state".

The term "express linkup state" is used to emphasize the linkup state that is set according to an example embodiment. In the express linkup state, the time taken to link the two electronic devices 110, 120 is shorter than the time taken to set the normal linkup state at least because the express linkup state does not require exchanging a large amount of information, while setting the normal linkup state requires exchanging a lot of information. Accordingly, it is possible to set the linkup state quickly according to an example embodiment. Example embodiments will be described in more detail with reference to FIGS. 4 through 12.

Figure 4:
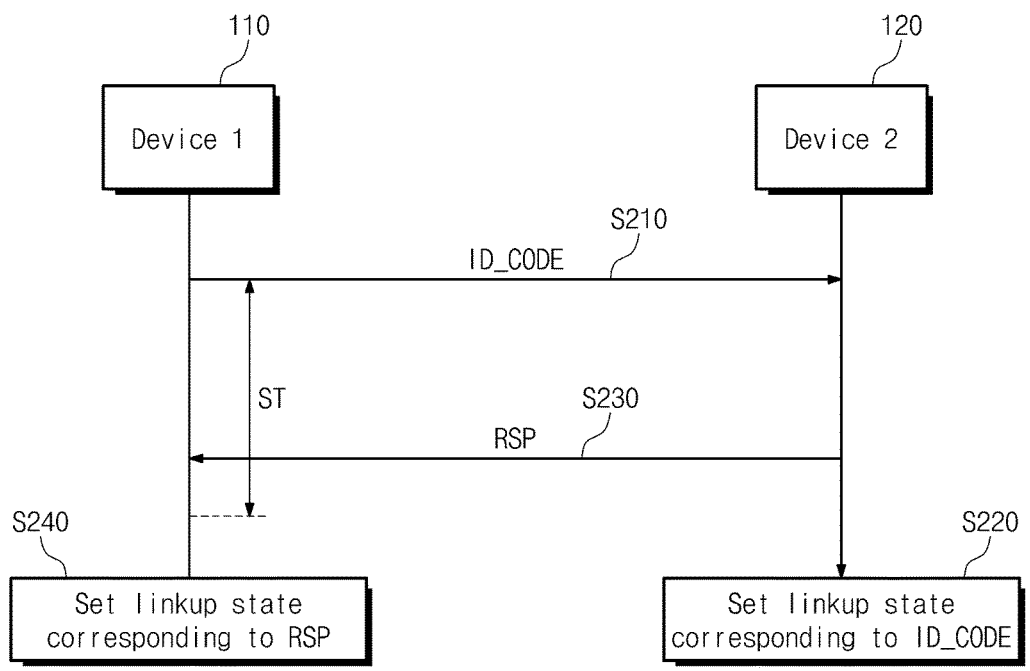
FIG. 4 is a flow chart describing a process in which two electronic devices are set to a linkup state according to an example embodiment.

FIG. 4 is a flow chart describing a process in which two electronic devices are set to a linkup state according to an example embodiment. For discussion purposes only, it is herein assumed that the first electronic device 110 is a host (e.g., a device including an application processor). However, example embodiments are not limited thereto. For instance, in some example embodiments, the second electronic device 120 may be a host.

Referring to FIG. 4, in some example embodiments the link startup process may be performed in a "single-end" manner in which one of the electronic devices 110, 120 firstly starts to process. However, unlike an the illustration of FIG. 4, in other example embodiments, the link startup process may be performed in a "both-end" manner in which the wo electronic devices 110, 120 simultaneously start to process. Example embodiments may be variously changed or modified as necessary. FIG. 4 is just an example to describe one of possible example embodiments, and is not to limit the example embodiments.

First, the first electronic device 110 may be physically connected with the second electronic device 120 through the first interface circuit 113 (refer to FIG. 1), and the second electronic device 120 may be physically connected with the first electronic device 110 through the second interface circuit 123 (refer to FIG. 1). The first electronic device 110 may sense a connection of the second electronic device 120, and the second electronic device 120 may sense a connection of the first electronic device 110. In some example embodiments, operations described with reference to FIG. 4 may be performed under the control of the first controller 115 (refer to FIG. 1) of the first electronic device 110 and the second controller 125 (refer to FIG. 1) of the second electronic device 120.

In operation S210, the first electronic device 110 may provide an identification code ID_CODE to the second electronic device 120. A value of the identification code ID_CODE may vary with an attribute of the first electronic device 110. As an example embodiment, the value of the identification code ID_CODE may vary with a type and a manufacturer of the first electronic device 110. The second electronic device 120 may recognize the attribute of the first electronic device 110, based on a value the received identification code ID_CODE. As an example embodiment, the second electronic device 120 may recognize a type and a manufacturer of the first electronic device 110, based on the value of the received identification code ID_CODE.

After providing the identification code ID_CODE, the first electronic device 110 may wait during a stand-by time ST. In particular, the first electronic device 110 may wait to receive a response signal RSP from the second electronic device 120 during the stand-by time ST. For instance, the stand-by time ST may have a particular value. Alternatively, the stand-by time ST may be variable as necessary.

In operation S220, the second electronic device 120 may enter a linkup state that enables data communications with the first electronic device 110. In particular, a state of the second interface circuit 123 of the second electronic device 120 may be set as a linkup state corresponding to the identification code ID_CODE received in operation S210. In an example embodiment, the second electronic device 120 may enter the linkup state without exchanging information with the first electronic device, based on the identification code ID_CODE. Thus, according to an example embodiment, the linkup state may be set rapidly. The linkup state that is set according to an example embodiment may be called as an "express linkup state".

As an example embodiment, when the second electronic device 120 has stored (or, alternatively, pre-stored) the value of the identification code ID_CODE and can identify the first electronic device 110 based on the stored identification code ID_CODE, a state of the second interface circuit 123 of the second electronic device 120 may be quickly set as the express linkup state corresponding to the identification code ID_CODE. As another example embodiment, when the second electronic device 120 can operate according to an example embodiment even if the second electronic device 120 does not store the value of the identification code ID_CODE, a state of the second interface circuit 123 of the second electronic device 120 may be quickly set as the express linkup state corresponding to the identification code ID_CODE. Setting the express linkup state will be more described with reference to FIGS. 5 through 12.

In operation S230, the second electronic device 120 may provide the response signal RSP to the first electronic device 110. The response signal RSP may correspond to the identification code ID_CODE. That is, the response signal RSP may be a signal for responding to the identification code ID_CODE. When the response signal RSP is provided within the stand-by time ST, the first electronic device 110 may recognize that the identification code ID_CODE is normally provided to the second electronic device 120 and the second electronic device 120 can operate with the identification code ID_CODE. That is, the second electronic device 120 may provide the response signal RSP in order to notify the first electronic device 110 that the second electronic device 120 can perform express linkup according to an example embodiment.

The first electronic device 110 may recognize an attribute of the second electronic device 120, based on the received response signal RSP. As an example embodiment, the first electronic device 110 may recognize a type and a manufacturer of the second electronic device 120, based on the received response signal RSP.

In operation S240, the first electronic device 110 may enter a linkup state that enables data communications with the second electronic device 120. In particular, when the response signal RSP is provided within the stand-by time ST, a state of the first interface circuit 113 of the first electronic device 110 may be set as a linkup state corresponding to the response signal RSP received in operation S230. In an example embodiment, the first electronic device 110 may enter the express linkup state without exchanging information with the second electronic device 120, based on the response signal RSP. The express linkup state makes it possible for the first electronic device 110 and the second electronic device 120 to perform data communication stably.

The first electronic device 110 may perform operation S240 to set the first electronic device 110 to the express linkup state independently of the second electronic device 120 performing operation S220 to set the second electronic device 120 to the express linkup state. Thus, operation S240 may precede operation S220 or may follow operation S220. Alternatively, operations S240 and S220 may be performed simultaneously (i.e., in parallel).

Further, the second electronic device 120 performs operation S230 independently of operation S220. Thus, operation S230 may precede operation S220 or may follow operation S220. Alternatively, operations S230 and S220 may be performed simultaneously.

According to an example embodiment of FIG. 4, the link startup process that requires exchanging a lot of information may be skipped. The first electronic device 110 may operate according to an example embodiment, based on the response signal RSP. The second electronic device 120 may operate according to an example embodiment, based on the identification code ID_CODE. Thus, each of the first electronic device 110 and the second electronic device 120 may enter the express linkup state.

The controllers 115, 125 may perform the operations illustrated in FIG. 4 during an initialization operation or a booting operation of the electronic devices 110, 120. Alternatively, the controllers 115, 125 may perform the operations illustrated in FIG. 4 during an operation for recovering an error of a linkup state. With the example embodiment of FIG. 4, time taken to perform the initialization operation, the booting operation, or the recovery operation of an electronic device may be reduced.

As an example embodiment, when the response signal RSP is not provided within the stand-by time ST, the first electronic device 110 may operate according to operations S140, S150, and S160 of FIG. 3. In this case, the second electronic device 120 may also operate according to operations S140, S150, and S160 of FIG. 3.

Figure 5:
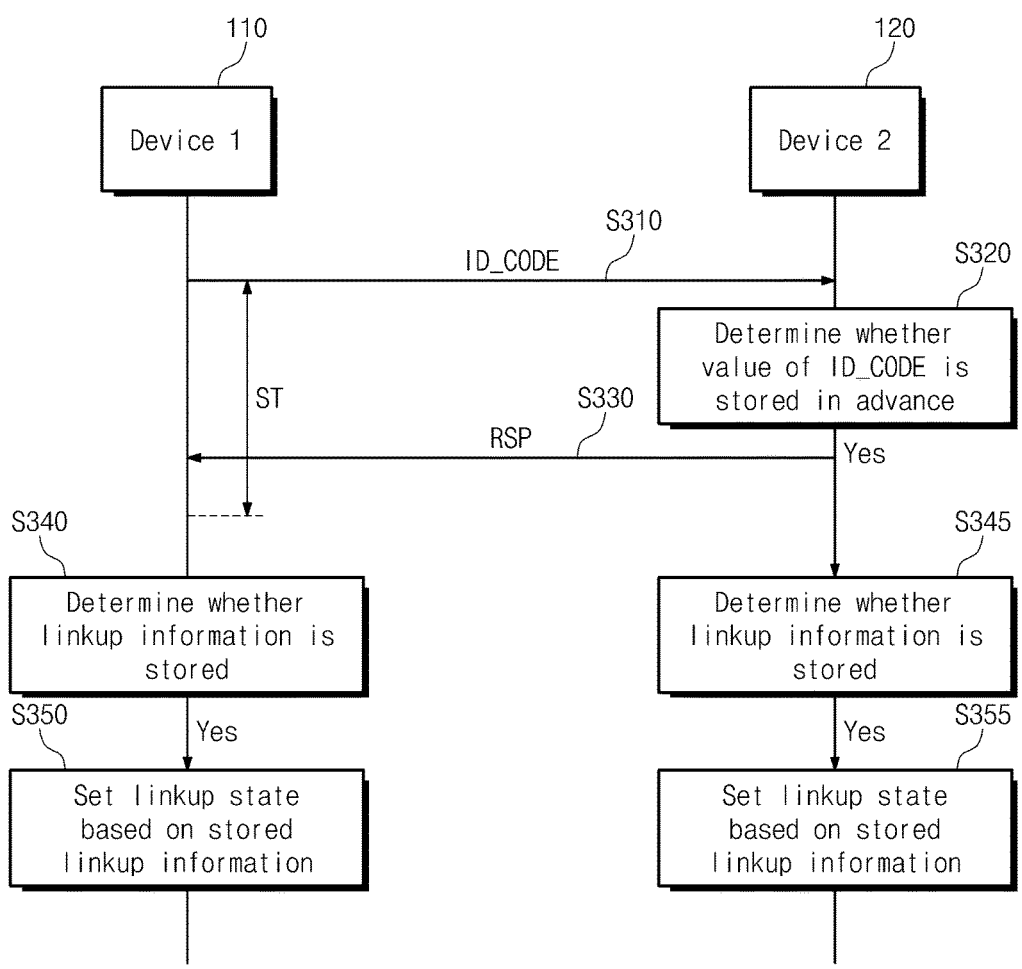
FIG. 5 is a flow chart describing a process in which two electronic devices are set to a linkup state according to an example embodiment.

FIG. 5 is a flow chart describing a process in which two electronic devices are set to a linkup state according to an example embodiment. FIG. 5 is just an example to describe one of possible example embodiments, and does not intend to limit the example embodiments.

Referring to FIG. 5, first, the first electronic device 110 may sense a connection of a second electronic device 120, and the second electronic device 120 may sense a connection of the first electronic device 110. As an example embodiment, operations described with reference to FIG. 5 may be performed under the control of the first controller 115 (refer to FIG. 1) of the first electronic device 110 and the second controller 125 (refer to FIG. 1) of the second electronic device 120.

In operation S310, the first electronic device 110 may provide an identification code ID_CODE to the second electronic device 120. The second electronic device 120 may recognize an attribute of the first electronic device 110, based on a value the received identification code ID_CODE. As an example embodiment, the second electronic device 120 may recognize a type and a manufacturer of the first electronic device 110, based on the value of the received identification code ID_CODE.

After providing the identification code ID_CODE, the first electronic device 110 may wait during a stand-by time ST. In particular, the first electronic device 110 may wait to receive a response signal RSP from the second electronic device 120 during the stand-by time ST.

In operation S320, the second electronic device 120 may determine whether a value of the identification code ID_CODE is stored in advance. As an example embodiment, the value of the identification code ID_CODE may have previously stored in a memory area of the second electronic device 120. For instance, when the first electronic device 110 is a widely used electronic device manufactured by a well-known manufacturer, the second electronic device 120 may have previously stored the value of the identification code ID_CODE to identify the first electronic device 110. Operations S330 and S345 may be performed in response to determining that the value of the identification code ID_CODE is stored, in advance, in the second electronic device 120.

In operation S330, as an example embodiment, the second electronic device 120 may provide the response signal RSP to the first electronic device 110. When the response signal RSP is provided within the stand-by time ST, the first electronic device 110 may recognize that the identification code ID_CODE is normally provided to the second electronic device 120 and the second electronic device 120 can operate with the identification code ID_CODE. That is, the second electronic device 120 may provide the response signal RSP to the first electronic device 110 in order to notify the first electronic device 110 that the second electronic device 120 can perform the express linkup according to an example embodiment.

The first electronic device 110 may recognize an attribute of the second electronic device 120, based on the received response signal RSP. As an example embodiment, the first electronic device 110 may recognize a type and a manufacturer of the second electronic device 120, based on the received response signal RSP.

In operation S340, the first electronic device 110 may determine whether linkup information is stored. The linkup information is information used to set an express linkup state. As an example embodiment, the linkup information may include at least one of information associated with a connection of a lane used for data communications between the first electronic device 110 and the second electronic device 120, information associated with capability of the first electronic device 110, and information associated with capability of the second electronic device 120. The linkup information will be more described with reference to FIG. 6. As an example embodiment, the linkup information may be stored in a memory area of the first electronic device 110. The method may proceed to operation S350 when the linkup information is stored in the first electronic device 110.

In operation S350, the first electronic device 110 may enter the express linkup state. In particular, the express linkup state of the first electronic device 110 may be set based on the stored linkup information. As described above, the linkup information is information used to set the express linkup state. Thus, the first electronic device 110 may refer to the linkup information without exchanging information with the second electronic device 120 in order to enter the express linkup state for data communications with the second electronic device 120. In particular, the express linkup state of the first electronic device 110 may be a linkup state corresponding to the response signal RSP. Thus, the express linkup state of the first electronic device 110 may be a state (e.g., a lane connection, a signal transfer speed, and so on) suitable for exchanging data with the second electronic device 120.

In operation S345, the second electronic device 120 may determine whether linkup information is stored. As an example embodiment, the linkup information may be stored in a memory area of the second electronic device 120. The method may proceed to operation S355 when the linkup information is stored in the second electronic device 120.

In operation S355, the second electronic device 120 may enter the express linkup state. In particular, the express linkup state of the second electronic device 120 may be set based on the stored linkup information. The second electronic device 120 may refer to the linkup information without exchanging information with the first electronic device 110 in order to enter the express linkup state for data communications with the first electronic device 110. In particular, the express linkup state of the second electronic device 120 may be a linkup state corresponding to the identification code ID_CODE. Thus, the express linkup state of the second electronic device 120 may be a state suitable for exchanging data with the first electronic device 110.

The first electronic device may perform operations S340 and S350 to set the first electronic device 110 to the express linkup state independently of the second electronic device 120 performing operations S345 and S355 to set the second electronic device 120 to the express linkup state. Thus, operations S340 and S350 may precede operations S345 and S355 or may follow operations S345 and S355. Alternatively, operations S340 and S350 may be simultaneously performed with operations S345 and S355.

Further, the second electronic device 120 may perform operation S330 independently on operations S345 and S355. Thus, operation S330 may precede operations S345 and S355 or may follow operations S345 and S355. Alternatively, operation S330 may be simultaneously performed with operations S345 and S355.

According to an example embodiment of FIG. 5, the link startup process that requires exchanging a lot of information may be skipped. The first electronic device 110 may identify the second electronic device 120, based on the response signal RSP. The first electronic device 110 may obtain information associated with a state (e.g., a lane connection, a signal transfer speed, and so on) suitable for exchanging data with the second electronic device 120, based on the stored linkup information. The second electronic device 120 may identify the first electronic device 110, based on the identification code ID_CODE. The second electronic device 120 may obtain information associated with a state suitable for exchanging data with the first electronic device 110, based on the stored linkup information. Thus, each of the first electronic device 110 and the second electronic device 120 may enter the express linkup state.

The controllers 115, 125 may perform the operations illustrated in FIG. 5 during an initialization operation or a booting operation of the electronic devices 110, 120. Alternatively, the controllers 115, 125 may perform the operations illustrated in FIG. 5 during an operation for recovering an error of a linkup state. With the example embodiment of FIG. 5, time taken to perform the initialization operation, the booting operation, or the recovery operation of the electronic devices 110, 120 may be reduced.

FIG. 6 is a table for describing an identification code and linkup information according to an example embodiment. In some example embodiments the data in the table shown in FIG. 6 may be stored in a memory area of the second electronic device 120. For instance, the second electronic device 120 may store, in the memory array, an identification code ID_CODE and linkup information, corresponding to each of electronic devices having different attributes (e.g., types and manufacturers). However, example embodiments are not limited thereto.

In operation 310 (refer to FIG. 5), the second electronic device 120 may receive the identification code ID_CODE having a value of "0xA1". In operation S320 (refer to FIG. 5), the second electronic device 120 may determine whether the identification code ID_CODE having a value of "0xA1" is stored in a memory area. Referring to FIG. 6, the identification code ID_CODE having a value of "0xA1" is stored in a memory area of the second electronic device 120. Thus, the second electronic device 120 may recognize that the first electronic device 110 has attributes corresponding to device "A". In operation S330 (refer to FIG. 5), the second electronic device 120 may provide a response signal RSP to the first electronic device 110.

In operation S345 (refer to FIG. 5), the second electronic device 120 may determine whether linkup information corresponding to the identification code ID_CODE having a value of "0xA1" is stored. As described above, the linkup information is information used to set an express linkup state. As an example embodiment, the linkup information may include at least one of information associated with a connection of a lane used for data communications between the first electronic device 110 and the second electronic device 120, information associated with capability of the first electronic device 110, and information associated with capability of the second electronic device 120.

In FIG. 6, the linkup information for enabling data communications with device A is stored in a memory area of the second electronic device 120. Thus, in operation S355 (refer to FIG. 5), the second electronic device 120 may enter the express linkup state without exchanging information with the first electronic device 110 based on the stored linkup information.

In an example embodiment shown in FIG. 6, when receiving the identification code ID_CODE having a value of "0xA1", the second electronic device 120 may activate two transmitters and one receiver based on the stored linkup information and may set an interface condition for exchanging data at a speed of 3 Gbps. The second electronic device 120 may further set other interface conditions based on the stored linkup information. Thus, a state of the second electronic device 120 may be set as the express linkup state corresponding to the identification code ID_CODE having a value of "0xA1".

Similarly, when receiving the identification code ID_CODE having a value of "0xA2", the second electronic device 120 may recognize that an electronic device having an attribute corresponding to a device B is connected as the first electronic device 110. When receiving the identification code ID_CODE having a value of "0xA2", the second electronic device 120 may activate one transmitter and one receiver and may set an interface condition for exchanging data at a speed of 1.5 Gbps, by referring the stored linkup information. Thus, a state of the second electronic device 120 may be set as the express linkup state corresponding to the identification code ID_CODE having a value of "0xA2".

Linkup information may allow the electronic devices to interface with widely used electronic devices that are manufactured by well-known manufacturers. Thus, a link startup process that requires exchanging a lot of information may be skipped when a well-known electronic device is used and linkup information for interfacing with the well-known electronic device is previously stored according to an example embodiment. Accordingly, time taken to set a linkup state may be reduced.

Other example embodiments will be further described. When receiving the identification code ID_CODE having a value of "0xA4", the second electronic device 120 may recognize that an electronic device having an attribute corresponding to a device "C" is connected as the first electronic device 110. However, linkup information for enabling data communications with device C is not stored in a memory area of the second electronic device 120.

When there is no stored linkup information for the device C, in some example embodiments, the second electronic device 120 may receive linkup information associated with the device C when the second electronic device 120 is firstly connected with the device C. The second electronic device 120 may store the received linkup information such that the second electronic device 120 builds a linkup information database over time containing linkup information for corresponding electronic devices. When again receiving the identification code ID_CODE having a value of "0xA4", the second electronic device 120 may enter an express linkup state based on the stored linkup information. This example embodiment will be more described with reference to FIGS. 7 and 8.

Further, in addition to not having the linkup information stored in the memory area, when receiving the identification code ID_CODE, the second electronic device 1120 may recognize that the received ID_CODE is not stored in a memory area of the second electronic device 120.

For example, the second electronic device 120 may receive the identification code ID_CODE having a value of "0xA8" (i.e., assuming that the second electronic device 120 is connected with the first electronic device 110 providing the identification code ID_CODE having a value of "0xA8"). Referring to FIG. 6, the identification code ID_CODE having a value of "0xA8" is not stored in a memory area of the second electronic device 120. In this case, the second electronic device 120 may receive linkup information that corresponds to the identification code ID_CODE having a value of "0xA8", when the second electronic device 120 is firstly connected with the first electronic device 110 that provides the identification code ID_CODE having a value of "0xA8". The second electronic device 120 may store the received identification code ID_CODE and the received linkup information. When again receiving the identification code ID_CODE having a value of "0xA8", the second electronic device 120 may enter the express linkup state based on the stored linkup information. This example embodiment will be more described with reference to FIG. 9.

The first electronic device 110 may store data similar to data shown in FIG. 6 in a memory area. However, as described above, the first electronic device 110 may operate based on a response signal RSP instead of the identification code ID_CODE. The first electronic device 110 may store the response signal RSP and linkup information corresponding to each of electronic devices with different attributes. When the first electronic device 110 can operate based on the response signal RSP, the first electronic device 110 may enter the express linkup state based on linkup information stored in a memory area or linkup information received from the second electronic device 120. Redundant descriptions will be omitted below for brevity of the description.

Kinds and the number of devices that may be identified by the first electronic device 110 and/or the second electronic device 120 may be variously changed or modified. In addition, linkup information may further include other information needed to set a linkup state as well as information associate with a connection of a lane and information associated with capability of an electronic device. For instance, when the first electronic device 110 and the second electronic device 120 operate in compliance with the UniPro and M-PHY interface protocols, linkup information may include all information that is exchanged during a link startup process defined in the UniPro and M-PHY interface protocols. The table shown in FIG. 6 is just an example to help understanding some of the example embodiments, and does not intend to limit the example embodiments.

When the first electronic device 110 and the second electronic device 120 operate in compliance with a specific interface protocol, values of an identification code ID_CODE and a response signal RSP are selected to be different from values defined and reserved by the specific interface protocol. In order to avoid a collision with the values defined and reserved by an interface protocol, the values defined and reserved in the specification are not used as the values of the identification code ID_CODE and the response signal RSP. The values of the identification code ID_CODE and the response signal RSP may be arbitrarily selected if the values defined and reserved in the specification are avoided.

However, the values of the identification code ID_CODE and the response signal RSP may be fixed to identify a specific electronic device. For instance, a manufacturer P that manufactures the second electronic device 120 may confer with a manufacturer Q that manufactures the first electronic device 110, so as to identify an opponent device based on an identification code ID_CODE or a response signal RSP having a value of "0xA1". However, the example embodiments may not be limited thereto.

Figure 7:
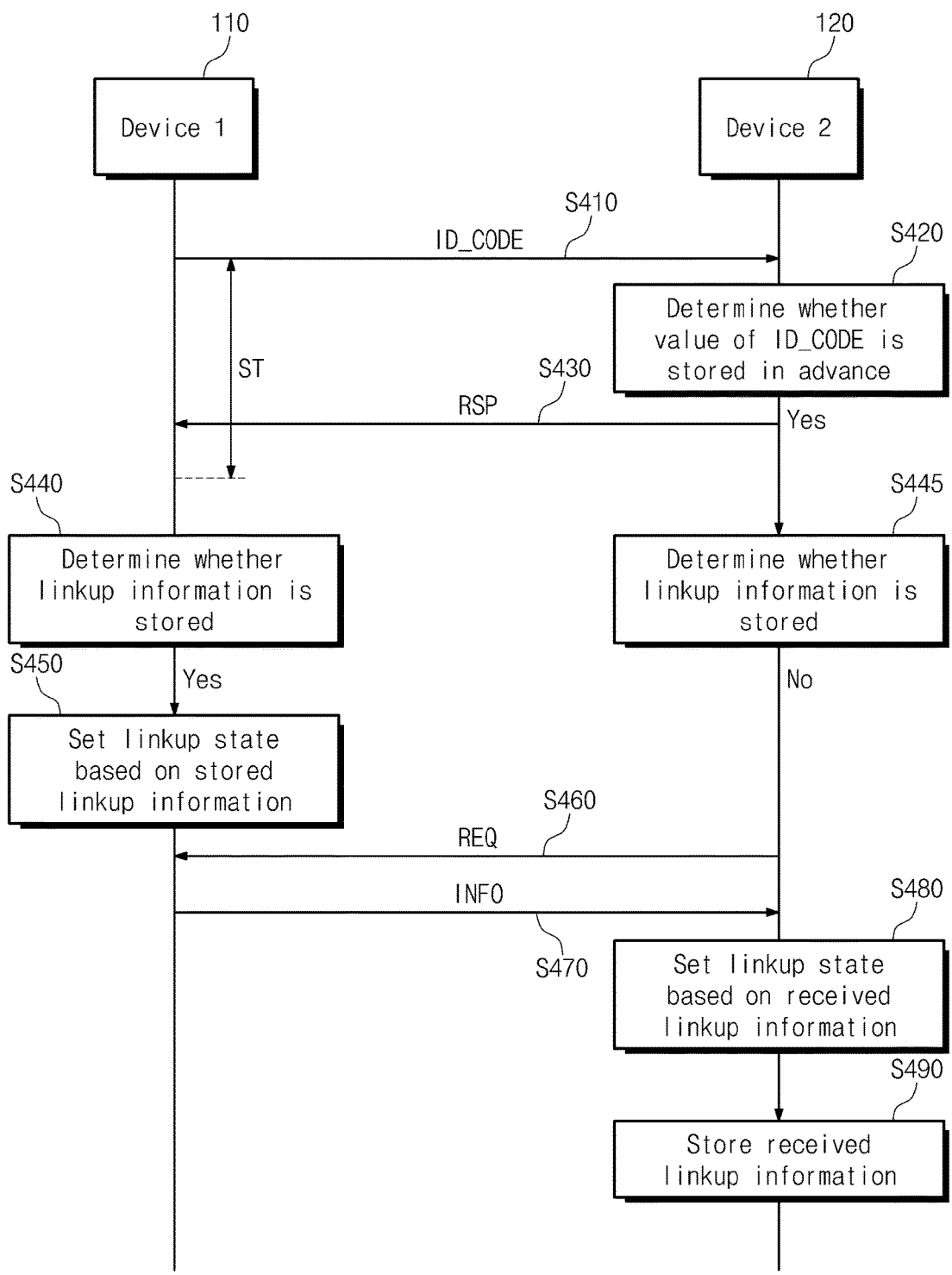
FIG. 7 is a flow chart describing a process in which two electronic devices are set to a linkup state according to an example embodiment.

FIG. 7 is a flow chart describing a process in which two electronic devices are set to a linkup state according to an example embodiment. FIG. 7 is just an example to describe possible example embodiments, and example embodiments may not be limited thereto.

Referring to FIG. 7, first, each of the first electronic device 110 and the second electronic device 120 may sense a connection of an opponent device. As an example embodiment, operations described with reference to FIG. 7 may be performed under a control of the first controller 115 (refer to FIG. 1) of the first electronic device 110 and the second controller 125 (refer to FIG. 1) of the second electronic device 120.

In operation S410, the first electronic device 110 may provide an identification code ID_CODE to the second electronic device 120. The second electronic device 120 may receive the identification code ID_CODE from the first electronic device 110. The identification code ID_CODE has been described with reference to FIGS. 4 through 6, and redundant descriptions will be omitted below for brevity of the description.

After providing the identification code ID_CODE, the first electronic device 110 may wait during a stand-by time ST. In particular, the first electronic device 110 may wait for receiving a response signal RSP from the second electronic device 120 during the stand-by time ST.

In operation S420, the second electronic device 120 may determine whether a value of the identification code ID_CODE is stored (or alternatively, pre-stored). As an example embodiment, when the first electronic device 110 is a widely used electronic device manufactured by a well-known manufacturer, the second electronic device 120 may have previously stored a value of the identification code ID_CODE for identifying the first electronic device 110.

The second electronic device 120 may perform operations S430 and S445 in response to determining that a value of the identification code ID_CODE has previously stored.

In operation S430, the second electronic device 120 may provide the response signal RSP to the first electronic device 110. The response signal RSP has been described with reference to FIGS. 4 through 6, and redundant descriptions will be omitted below for brevity of the description.

In operation S440, the first electronic device 110 may determine whether linkup information is stored. The linkup information has been described with reference to FIG. 6, and redundant descriptions will be omitted below. As an example embodiment, the linkup information may be stored in a memory area of the first electronic device 110.

The first electronic device 110 may perform operation S450 when the linkup information is stored in the first electronic device 110.

In operation S450, the first electronic device 110 may enter an express linkup state. In particular, a state of the first interface circuit 113 (refer to FIG. 1) of the first electronic device 110 may be set as the express linkup state based on the response signal RSP and the stored linkup information.

In operation S445, the second electronic device 120 may determine whether linkup information is stored. However, as described with reference to FIG. 6, linkup information associated with one or more electronic devices may not be stored in a memory area of the second electronic device 120 (e.g., in FIG. 6, linkup information associated with a device C is not stored in a memory area of the second electronic device 120).

The electronic devices 110, 120 may perform operations S460 through S490 when the linkup information is not stored in the second electronic device 120.

In operation S460, the second electronic device 120 may provide a request signal REQ to the first electronic device 110. The request signal REQ is a signal for requesting information needed to set the express linkup state. As an example embodiment, the second electronic device 120 may provide the request signal REQ to request lane connection information of the first electronic device 110 and capability information of the first electronic device 110 to the first electronic device 110.

In operation S470, the first electronic device 110 may provide linkup information INFO needed to set the express linkup state to the second electronic device 120. As an example embodiment, the second electronic device 120 may receive lane connection information and capability information of the first electronic device 110. However, the example embodiments are not limited thereto. The second electronic device 120 may receive other information for setting the express linkup state as well as the lane connection information and the capability information of the first electronic device 110.

As an example embodiment, providing the request signal REQ of S460 and providing the linkup information INFO of S470 may be performed by an additionally or separately defined procedure. As another example embodiment, providing the request signal REQ of S460 and providing the linkup information INFO of S470 may be performed by a procedure similar to a link startup process that is defined by the UniPro interface protocol.

In operation S480, the second electronic device 120 may enter the express linkup state. In particular, the express linkup state of the second electronic device 120 may be set based on the linkup information INFO (e.g., lane connection information and capability information) received in operation S470. Unlike operation S355 of FIG. 5, in operation S480, the express linkup state of the second electronic device 120 may be set based on the separately provided linkup information INFO, not stored (or, alternatively, pre-stored) linkup information. However, the express linkup state may be set through a procedure that is similar to that described with reference to FIGS. 4 through 6.

In operation S490, the second electronic device 120 may store the linkup information INFO (e.g., lane connection information and capability information) received in operation S470 in a memory area. When the first electronic device 110 is reconnected with the second electronic device 120 after the first electronic device 110 and the second electronic device 120 are disconnected, or when an operation for recovering an error of the linkup state is performed, the linkup information stored in operation S490 may be referred. That is, when again receiving the identification code ID_CODE from the first electronic device 110, the second electronic device 120 may enter the express linkup state based on the linkup information stored in operation S490 without exchanging information with the first electronic device 110. This example embodiment will be more described with reference to FIG. 12.

The first electronic device 110 may perform operations S440 and S450 independently of the second electronic device 120 performing operation S445. Thus, operations S440 and S450 may precede operation S445 or may follow operation S445. Alternatively, operations S440 and S450 may be simultaneously performed with operation S445. In addition, the second electronic device 120 may perform operation S430 independently of operation S445. Thus, operation S430 may precede operation S445 or may follow operation S445. Alternatively, operation S430 may be simultaneously performed with operation S445.

FIG. 7 describes that operations S440 and S450 precede operations S460 and S470. However, operations S440 and S450 may follow operations S460 and S470 or may be performed in parallel with operations S460 and S470. Once operations S460 and S470 are performed, operations S480 and S490 may be performed at any time. In addition, the second electronic device 120 may perform operation S480 independently of operation S490. Thus, operation S480 may precede operation S490 or may follow operation S490. Alternatively, operation S480 may be performed in parallel with operation S490.

Figure 8:
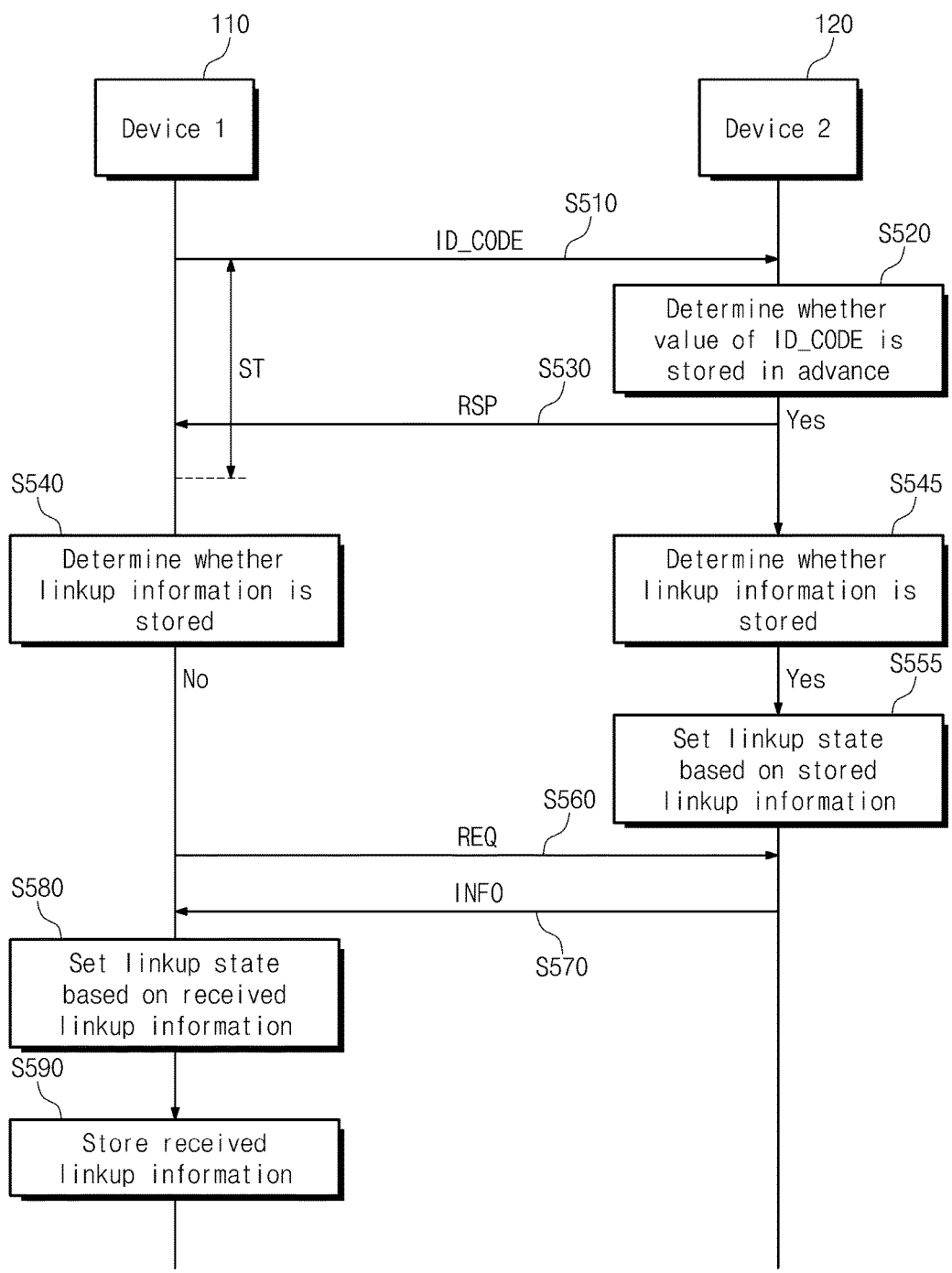
FIG. 8 is a flow chart describing a process in which two electronic devices are set to a linkup state according to an example embodiment.

FIG. 8 is a flow chart describing a process in which two electronic devices are set to a linkup state according to an example embodiment. FIG. 8 is just an example to describe one of possible example embodiments, and example embodiments are not limited thereto.

Referring to FIG. 8, first, each of a first electronic device 110 and a second electronic device 120 may sense a connection of an opponent device. As an example embodiment, operations described with reference to FIG. 8 may be performed under a control of the first controller 115 (refer to FIG. 1) of the first electronic device 110 and the second controller 125 (refer to FIG. 1) of the second electronic device 120.

In operation S510, the first electronic device 110 may provide an identification code ID_CODE to the second electronic device 120. The second electronic device 120 may receive the identification code ID_CODE from the first electronic device 110. The identification code ID_CODE has been described with reference to FIGS. 4 through 6, and redundant descriptions will be omitted below for brevity of the description.

After providing the identification code ID_CODE, the first electronic device 110 may wait during a stand-by time ST. In particular, the first electronic device 110 may wait for receiving a response signal RSP from the second electronic device 120 during the stand-by time ST.

In operation S520, the second electronic device 120 may determine whether a value of the identification code ID_CODE is stored (or, alternatively pre-stored). As an example embodiment, the first electronic device 110 is a widely used electronic device manufactured by a well-known manufacturer, the second electronic device 120 may have previously stored a value of the identification code ID_CODE for identifying the first electronic device 110 in a memory area. Operations S530 and S545 may be performed in response to determining that a value of the identification code ID_CODE has previously stored in the second electronic device 120.

In operation S530, the second electronic device 120 may provide a response signal RSP to the first electronic device 110. The response signal RST has been described with reference to FIGS. 4 through 6, and redundant descriptions will be omitted below for brevity of the description.

In operation S540, the first electronic device 110 may determine whether linkup information is stored. The linkup information has been described with reference to FIG. 6, and redundant descriptions will be omitted below for brevity of the description. However, as described with reference to FIG. 6, linkup information associated with one or more electronic devices may not be stored in a memory area of the first electronic device 110.

The electronic devices 110, 120 may perform operations S560 through S590 when the linkup information is not stored in the first electronic device 110.

In operation S560, the first electronic device 110 may provide a request signal REQ to the second electronic device 120. The request signal REQ is a signal for requesting information needed to set the express linkup state. As an example embodiment, the first electronic device 110 may provide the request signal REQ to request lane connection information and capability information of the second electronic device 120 to the second electronic device 120.

In operation S570, the second electronic device 120 may provide linkup information INFO needed to set the express linkup state to the first electronic device 110. As an example embodiment, the first electronic device 110 may receive lane connection information and capability information of the second electronic device 120. However, example embodiments are not limited thereto. The first electronic device 110 may receive other information for setting the express linkup state as well as the lane connection information and the capability information.

As an example embodiment, providing the request signal REQ of S560 and providing the linkup information INFO of S570 may be performed by an additionally or separately defined procedure. As another example embodiment, providing the request signal REQ of S560 and providing the linkup information INFO (S570) may be performed by a procedure similar to a link startup process that is defined by the UniPro interface protocol.

In operation S580, the first electronic device 110 may enter the express linkup state. In particular, the express linkup state of the first electronic device 110 may be set based on the linkup information INFO (e.g., lane connection information and capability information) received in operation S570. Unlike operation S350 of FIG. 5, in operation S580, the express linkup state of the first electronic device 110 may be set based on separately provided linkup information INFO, not previously stored linkup information. However, the express linkup state may be set through a procedure that is similar to that described with reference to FIGS. 4 through 6.

In operation S590, the first electronic device 110 may store the linkup information INFO (e.g., lane connection information and capability information) received in operation S570 in a memory area. When the first electronic device 110 is reconnected to the second electronic device 120 after the first electronic device 110 and the second electronic device 120 are disconnected, or when an operation for recovering an error of the linkup state is performed, the linkup information stored in operation S590 may be referred. That is, when the first electronic device provides the identification code ID_CODE to the second electronic device 120 and receives the response signal RSP from the second electronic device 120 again, the first electronic device 110 may enter the express linkup state based on the linkup information stored in operation S590 without exchanging information with the second electronic device 120. This example embodiment will be more described with reference to FIG. 12.

In operation S545, the second electronic device 120 may determine whether linkup information is stored. As an example embodiment, linkup information may be stored in a memory area of the second electronic device 120.

The second electronic device 120 may perform operation S555 when the linkup information is stored in the second electronic device 120.

In operation S555, the second electronic device 120 may enter the express linkup state. In particular, the express linkup state of the second electronic device 120 may be set based on the stored linkup information. Operation S55 may be the same as operation S355.

The first electronic device 110 may perform operation S540 independently of the second electronic device 120 performing operations S545 and S555. Thus, operation S540 may precede operations S545 and S555 or may follow operations S545 and S555. Alternatively, operation S540 may be simultaneously performed with operations S545 and S555. In addition, the second electronic device 120 may perform operation S530 independently on operations S545 and S555. Thus, operation S530 may precede operations S545 and S555 or may follow operations S545 and S555. Alternatively, operation S530 may be simultaneously performed with operations S545 and S555.

FIG. 8 describes that operations S545 and S555 precede operations S560 and S570. However, operations S545 and S555 may follow operations S560 and S570 or may be performed in parallel with steps S560 and S570. Once operations S560 and S570 are performed, operations S580 and S590 may be performed at any time. In addition, the first electronic device 110 may perform operation S580 independently of operation S590. Thus, operation S580 may precede operation S590 or may follow operation S590. Alternatively, operation S580 may be simultaneously performed with operation S590.

Figure 9:
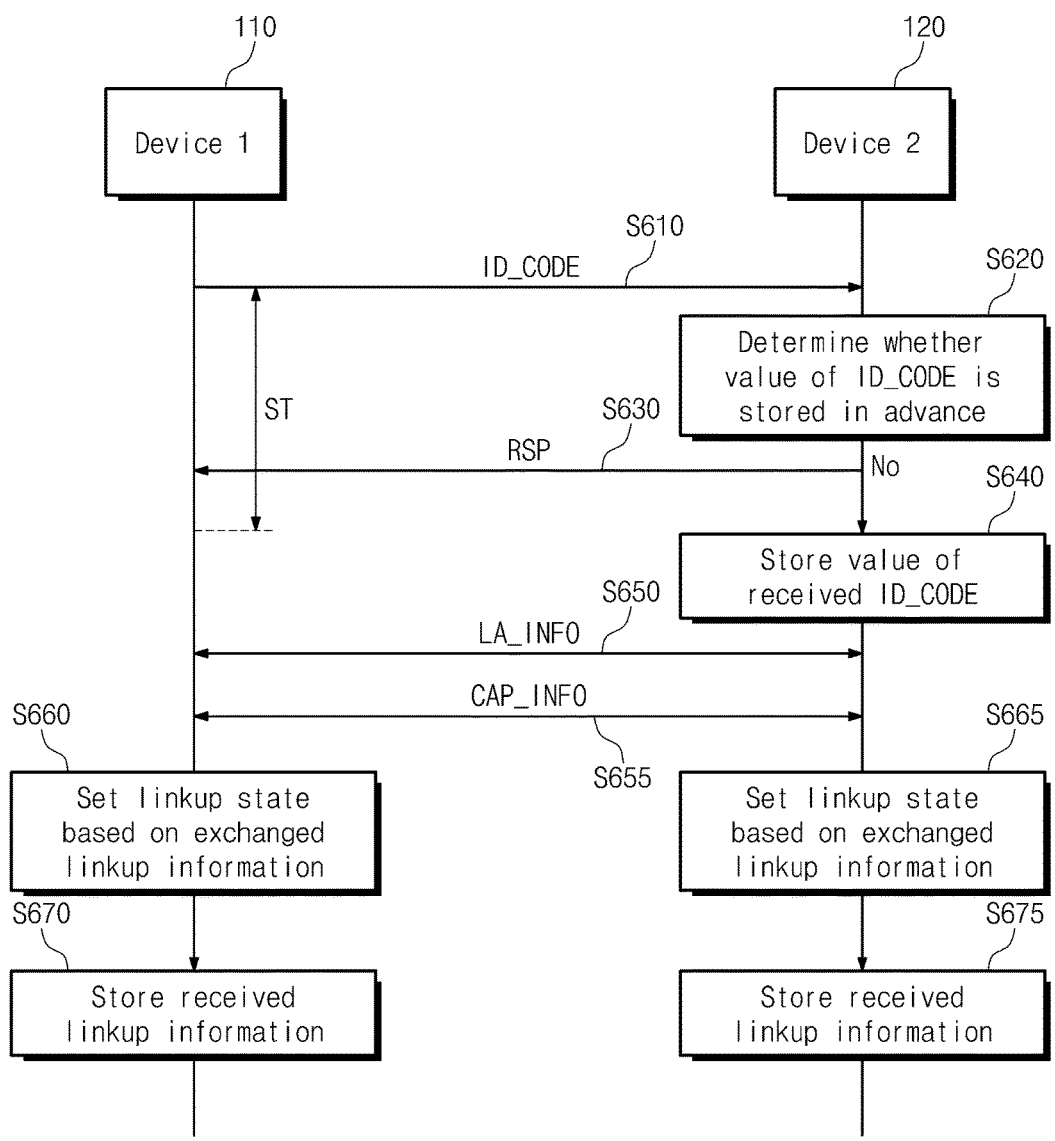
FIG. 9 is a flow chart describing a process in which two electronic devices are set to a linkup state according to an example embodiment.

FIG. 9 is a flow chart describing a process in which two electronic devices are set to a linkup state according to an example embodiment. FIG. 9 is just an example to describe possible example embodiments, and example embodiments are not limited thereto.

Referring to FIG. 9, first, each of the first electronic device 110 and the second electronic device 120 may sense a connection of an opponent device. As an example embodiment, operations described with reference to FIG. 9 may be performed under a control of the first controller 115 (refer to FIG. 1) of the first electronic device 110 and the second controller 125 (refer to FIG. 1) of the second electronic device 120.

In operation S610, the first electronic device 110 may provide an identification code ID_CODE to the second electronic device 120. The second electronic device 120 may receive the identification code ID_CODE from the first electronic device 110. The identification code ID_CODE has been described with reference to FIGS. 4 through 6, and redundant descriptions will be omitted below for brevity of the description.

After providing the identification code ID_CODE, the first electronic device 110 may wait during a stand-by time ST. In particular, the first electronic device 110 may wait for reception of a response signal RSP from the second electronic device 120 during the stand-by time ST.

In operation S620, the second electronic device 120 may determine whether a value of the identification code ID_CODE is stored (or, alternatively, pre-stored). As described with reference to FIG. 6, however, a value of the identification code ID_CODE associated with one or more electronic devices may not be stored in a memory area of the second electronic device 120 (e.g., in FIG. 6, an identification code ID_CODE having a value of "0xA8" is not stored in a memory area of the second electronic device 120).

The second electronic device 120 may perform operations S630 and 640 when the linkup information is not stored.

In operation S630, the second electronic device 120 may provide a response signal RSP to the first electronic device 110. Even though a value of the identification code ID_CODE is not stored in a memory area of the second electronic device 120, the second electronic device 120 may output the response signal RSP when the second electronic device 120 is capable of operating based on the identification code ID_CODE. Thus, the first electronic device 110 may recognize that the second electronic device 120 can perform express linkup according to an example embodiment. The response signal RST has been described with reference to FIGS. 4 through 6, and redundant descriptions will be omitted below for brevity of the description.

In operation S640, the second electronic device 120 may store the value of the identification code ID_CODE received in operation S610 in a memory area. When the first electronic device 110 is reconnected to the second electronic device 120 after the first electronic device 110 and the second electronic device 120 are disconnected, or when an operation for recovering an error of the linkup state is performed, the value of the identification code ID_CODE stored in operation S640 may be referred. This example embodiment will be described with reference to FIG. 12.

In operation S650, the first electronic device 110 and the second electronic device 120 may exchange lane connection information LA_INFO. As an example embodiment, when the first electronic device 110 and the second electronic device 120 operate in compliance with the UniPro interface protocol, the lane connection information LA_INFO may be exchanged in a manner similar to the patterns of TRG_UPR0, TRG_UPR1, and TRG_UPR2 that are defined by the UniPro specification. However, example embodiments are not limited thereto.

In operation S655, the first electronic device 110 and the second electronic device 120 exchange capability information CAP_INFO. As an example embodiment, when the first electronic device 110 and the second electronic device 120 operate in compliance with the UniPro interface protocol, the capability information CAP_INFO may be exchanged in a manner similar to the functions of PACP_CAP_ind and PACP_CAP_EXT1_ind that are defined by the UniPro specification. However, example embodiments are not limited thereto.

Operations S650 and S655 have been described as an example. However, other information needed to set the linkup state may be further exchanged between the first electronic device 110 and the second electronic device 120.

After operations S650 and S655 are performed, operations S660 through S675 may be performed.

In operation S660, the first electronic device 110 may enter the linkup state. In particular, a state of a first interface circuit 113 (refer to FIG. 1) of the first electronic device 110 may be set as the linkup state based on the response signal RSP and information exchanged in operations S650 and S655.

In operation S670, the first electronic device 110 may store the information exchanged in operations S650 and S655 in a memory area. When the first electronic device 110 is reconnected to the second electronic device 120 after the first electronic device 110 and the second electronic device 120 are disconnected, or when an operation for recovering an error of the linkup state is performed, the information stored in operation S670 may be referred. That is, when the first electronic device 110 provides the identification code ID_CODE to the second electronic device 120 and receives the response signal RSP from the second electronic device 120 again, the first electronic device 110 may enter the express linkup state based on the information stored in operation S670 without exchanging information with the second electronic device 120. This example embodiment will be more described with reference to FIG. 12.

In operation S665, the second electronic device 120 may enter the linkup state. In particular, a state of the second interface circuit 123 (refer to FIG. 1) of the second electronic device 120 may be set as the linkup state based on the identification code ID_CODE and the information exchanged in operations S650 and S655.

In operation S675, the second electronic device 120 may store the information INFO exchanged in operations S650 and S655 in a memory area. When the first electronic device 110 is reconnected to the second electronic device 120 after the first electronic device 110 and the second electronic device 120 are disconnected, or when an operation for recovering an error of the linkup state is performed, the information stored in operation S675 may be referred. That is, when again receiving the identification code ID_CODE from the first electronic device 110, the second electronic device 120 may enter the express linkup state based on the identification code ID_CODE stored in operation S640 and the information stored in operation S675 without exchanging information. This example embodiment will be more described with reference to FIG. 12.

The second electronic device 120 may perform operation S640 independently of operation S630. Thus, operation S640 may precede operation S630 or may follow operation S630. Alternatively, operation S640 may be performed in parallel with operation S630. In addition, operation S640 may precede operations S650 through 675 or may follow operations S650 through 675. Alternatively, operation S640 may be simultaneously performed with operations S650 through 675.

Operations S660 and S670 may precede operations S665 and S675 or may follow operations S665 and S675. Alternatively, operations S660 and S670 may be performed in parallel with operations S665 and S675. Once operations S650 and S655 are performed, operations S660 through S675 may be performed at any time.

The first electronic device 110 may perform operation S660 independently on operation S670. Thus, operation S660 may precede operation S670 or may follow operation S670. Alternatively, operation S660 may be simultaneously performed with operation S670. The second electronic device 120 may perform operation S665 independently on operation S675. Thus, operation S665 may precede operation S675 or may follow operation S675. Alternatively, operation S665 may be simultaneously performed with operation S675.

Figure 10:
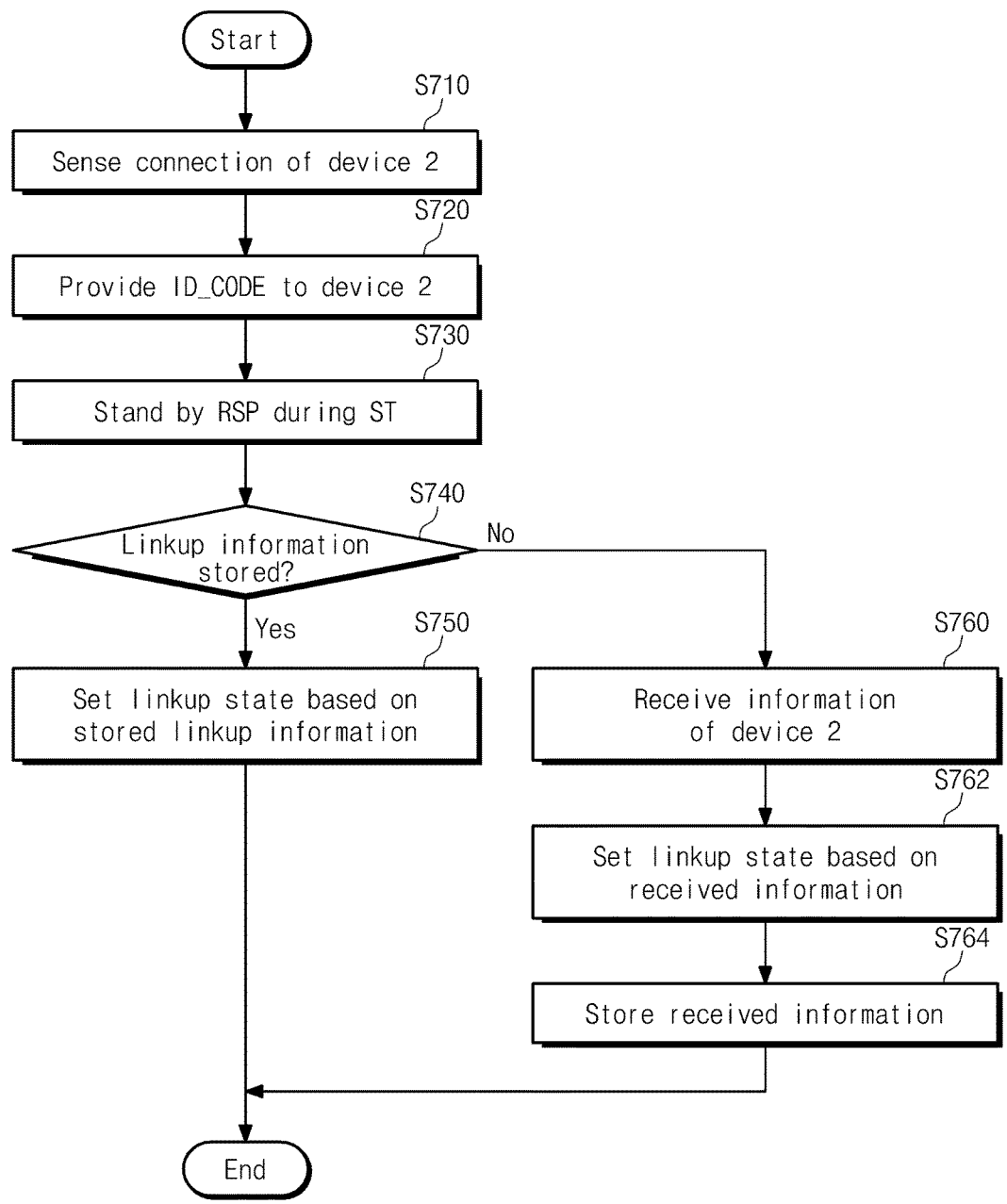
FIG. 10 is a flow chart describing an operation of an electronic device according to an example embodiment.

FIG. 10 is a flow chart describing an operation of an electronic device according to an example embodiment.

Referring to FIG. 10, FIG. 10 describes an operation of the first electronic device 110 of FIG. 1. As an example embodiment, operations described with reference to FIG. 10 may be performed according to a control of the first controller 115 (refer to FIG. 1) of the first electronic device 110. As an example embodiment, the first electronic device 110 may be a host (e.g., a device including an application processor). However, example embodiments not limited thereto.

In operation S710, the first electronic device 110 may sense a connection of the second electronic device 120. The first electronic device 110 may be physically connected with the second electronic device 120 through the first interface circuit 113.

In operation S720, the first electronic device 110 may provide an identification code ID_CODE to the second electronic device 120. A value of the identification code ID_CODE may vary with an attribute (e.g., a type and a manufacturer) of the first electronic device 110. The identification code ID_CODE may have a value that is different from values defined and reserved in the interface protocol defining the operating procedure of the first interface circuit 113. Detailed descriptions associated with the identification code ID_CODE will be omitted below for brevity of the description.

In operation S730, the first electronic device 110 may wait during a stand-by time ST. In particular, the first electronic device 110 may wait for reception of a response signal RSP corresponding to the identification code ID_CODE from the second electronic device 120 during the stand-by time ST. When the response signal RSP is provided within the stand-by time ST, a state of the first interface circuit 113 of the first electronic device 110 may be set as an express linkup state corresponding to the response signal RSP. Setting the express linkup state may be performed according to operations S740 through S764.

In operation S740, the first electronic device 110 may determine whether linkup information is stored in a memory area. The linkup information may be information (e.g., lane connection information and capability information) that is used to set the express linkup state. Detailed descriptions associated with the linkup information will be omitted below for brevity of the description.

The first electronic device 110 may perform to operation S750 when the linkup information is stored in the first electronic device 110. On the other hand, The first electronic device 110 may perform operation S760 when the linkup information is not stored in the first electronic device 110.

In operation S750, the first electronic device 110 may enter the express linkup state. In particular, a state of the first interface circuit 113 of the first electronic device 110 may be set as the express linkup state corresponding to the response signal RSP based on the stored linkup information.

In operation S760, the first electronic device 110 may receive linkup information needed to set the express linkup state from the second electronic device 120. As an example embodiment, the first electronic device 110 may receive lane connection information and capability information of the second electronic device 120. However, example embodiments are not limited thereto. The first electronic device 110 may receive other information needed to set the express linkup state as well as the lane connection information and the capability information.

In operation S762, the first electronic device 110 may enter the express linkup state. In particular, a state of the first electronic device 110 may be set as the express linkup state corresponding to the response signal RSP, based on the linkup information received in operation S760.

In operation S764, the first electronic device 110 may store the linkup information received in operation S760 in a memory area. When the first electronic device 110 is reconnected to the second electronic device 120 after the first electronic device 110 and the second electronic device 120 are disconnected, or when an operation for recovering an error of the linkup state is performed, the linkup information stored in operation S764 may be referred. This example embodiment will be more described with reference to FIG. 12.

The first electronic device 110 may perform operation S764 independently of operation S762. Thus, operation S764 may precede operation S762 or may follow operation S762. Alternatively, operation S764 may be performed in parallel with operation S762.

Figure 11:
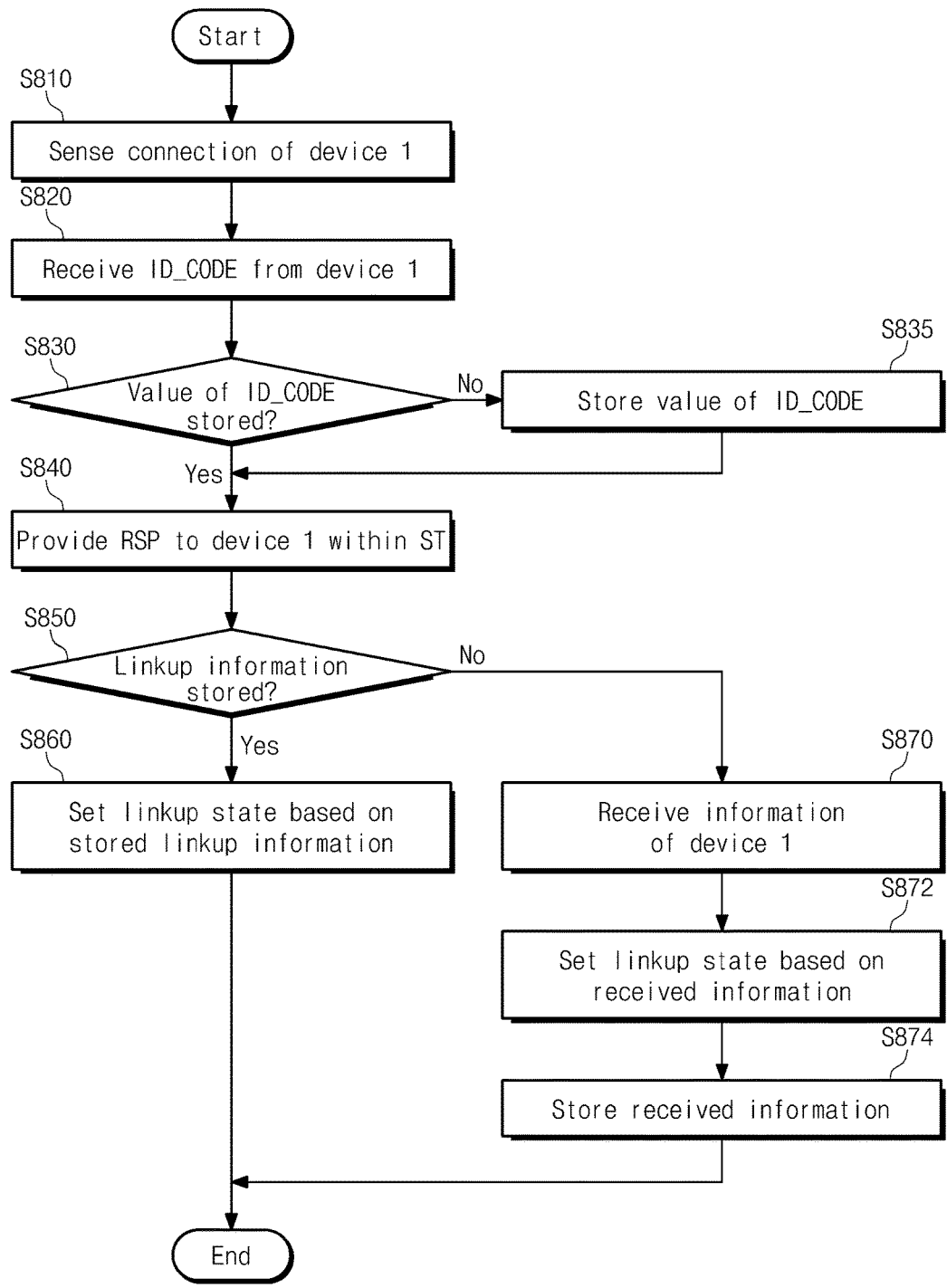
FIG. 11 is a flow chart describing an operation of an electronic device according to an example embodiment.

FIG. 11 is a flow chart describing an operation of an electronic device according to an example embodiment.

Referring to FIG. 11, FIG. 11 describes an operation of the second electronic device 120 of FIG. 1. Operations described with reference to FIG. 11 may be performed according to a control of the second controller 125 of the second electronic device 120. The second electronic device 120 may be a storage device that includes a nonvolatile memory and the second controller 125. However, example embodiments are not limited thereto.

In operation S810, the second electronic device 120 may sense a connection of a first electronic device 110 (refer to FIG. 1). The second electronic device 120 may be physically connected with the first electronic device 110 through a second interface circuit 123 (refer to FIG. 1).

In operation S820, the second electronic device 120 may receive an identification code ID_CODE from the first electronic device 110. Detail descriptions associated with the identification code ID_CODE will be omitted below for brevity of the description. When the identification code ID_CODE is provided, a state of the second interface circuit 123 of the second electronic device 120 may be set as an express linkup state corresponding to the identification code ID_CODE. Setting the express linkup state may be performed according to operations S830 through S874.

In operation S830, the second electronic device 120 may determine whether a value of the identification code ID_CODE received in operation S820 has previously stored in a memory area. When a value of the identification code ID_CODE is not previously stored in the second electronic device 120, in operation S835, the second electronic device 120 may store the value of the identification code ID_CODE in a memory area.

In operation S840, as an example embodiment, the second electronic device 120 may provide a response signal RSP corresponding to the identification code ID_CODE to the first electronic device 110. The second electronic device 120 may provide the response signal RSP within a stand-by time ST to notify the first electronic device 110 that the second electronic device 120 can operate according to an example embodiment.

In operation S850, the second electronic device 110 may determine whether linkup information is stored in a memory area. Detailed descriptions associated with the linkup information will be omitted below for brevity of the description. The method may proceed to operation S860 when the linkup information is stored in the second electronic device 120. On the other hand, the method may proceed to operation S870 when the linkup information is not stored in the second electronic device 120.

In operation S860, the second electronic device 120 may enter the express linkup state. In particular, a state of the second electronic device 120 may be set as the express linkup state corresponding to the identification code ID_CODE, based on the stored linkup information.

In operation S870, the second electronic device 120 may receive linkup information needed to set the express linkup state from the first electronic device 110. As an example embodiment, the second electronic device 120 may receive lane connection information and capability information of the first electronic device 110. However, example embodiments are not limited thereto. The second electronic device 120 may receive other information needed to set the express linkup state as well as the lane connection information and the capability information.

In operation S872, the second electronic device 120 may enter the express linkup state. In particular, a state of the second electronic device 120 may be set as the express linkup state corresponding to the identification code ID_CODE, based on the linkup information received in operation S870.

In operation S874, the second electronic device 120 may store the linkup information received in operation S870 in a memory area. When the first electronic device 110 is reconnected to the second electronic device 120 after the first electronic device 110 and the second electronic device 120 are disconnected, or when an operation for recovering an error of the linkup state is performed, the linkup information stored in operation S874 may be referred. This example embodiment will be more described with reference to FIG. 12.

Operation S874 is performed independently on operation S872. Thus, operation S874 may precede operation S872 or may follow operation S872. Alternatively, operation S874 may be simultaneously performed with operation S872.

Figure 12:
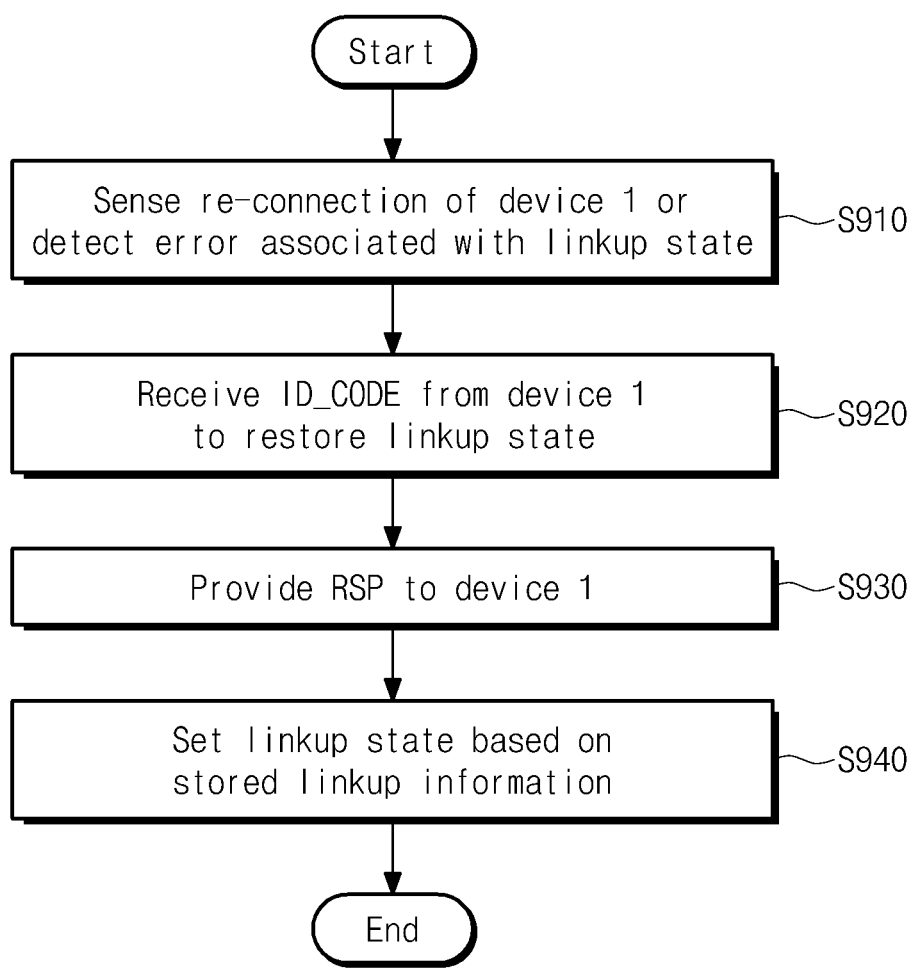
FIG. 12 is a flow chart describing restoration of an express linkup state according to an example embodiment.

FIG. 12 is a flow chart describing restoration of an express linkup state according to an example embodiment.

Referring to FIG. 12, in order to help understand the example embodiments, restoration of an express linkup state of the second electronic device 120 of FIG. 1 will be described. Restoration of an express linkup state of the first electronic device 110 of FIG. 1 may be performed according to operations that are similar to operations to be described below. Thus, detailed descriptions associated with the restoration of the express linkup state of the first electronic device 110 will be omitted below. As an example embodiment, operations described with reference to FIG. 12 may be performed according to a control of a second controller 125 (refer to FIG. 1) of the second electronic device 120.

In operation S910, the second electronic device 120 may sense a reconnection of the first electronic device 110. For instance, restoration of the express linkup state may be performed when the first electronic device 110 is reconnected to the second electronic device 120 after the first electronic device 110 and the second electronic device 120 are disconnected. Alternatively, in operation S910, the second electronic device 120 may detect an error of a linkup state. For instance, the restoration of the express linkup state may be performed to recover an error of the linkup state of the second electronic device 120.

In operation S920, the second electronic device 120 may receive an identification code ID_CODE from the first electronic device 110. Detailed descriptions associated with the identification code ID_CODE will be omitted below. The second electronic device 120 may restore the express linkup state based on the identification code ID_CODE.

In operation S930, as an example embodiment, the second electronic device 120 may provide a response signal RSP corresponding to the identification code ID_CODE to the first electronic device 110. Detailed descriptions associated with the response signal RSP will be omitted below.

In operation S940, the second electronic device 120 may enter the express linkup state. In particular, a state of a second interface circuit 123 (refer to FIG. 1) of the second electronic device 120 may be set as the express linkup state corresponding to the identification code ID_CODE. Setting the express linkup state may be performed based on a value of the stored identification code ID_CODE and the stored linkup information (e.g., lane connection information and capability information of the first electronic device 110).

When the restoration of the express linkup state is performed, a value of the identification code ID_CODE and the linkup information may be stored in advance (refer to operation S490 of FIG. 7, operation S590 of FIG. 8, operations S670 and S675 of FIG. 9, operation S764 of FIG. 10, and operation S874 of FIG. 11). The value of the stored identification code ID_CODE and the stored linkup information may be referred to restore the express linkup state. According to an example embodiment, a link startup process that requires exchanging a large amount of information may be omitted when the express linkup state is restored. That is, the second electronic device 120 may restore the express linkup state referring to the stored linkup information without exchanging information with the first electronic device 110. Thus, time taken to restore the linkup state may be reduced.

The second electronic device 120 may perform operation S940 independently of operation S930. Thus, operation S940 may precede operation S930 or may follow operation S930. Alternatively, operation S940 may be performed in parallel with operation S930.

Figure 13:
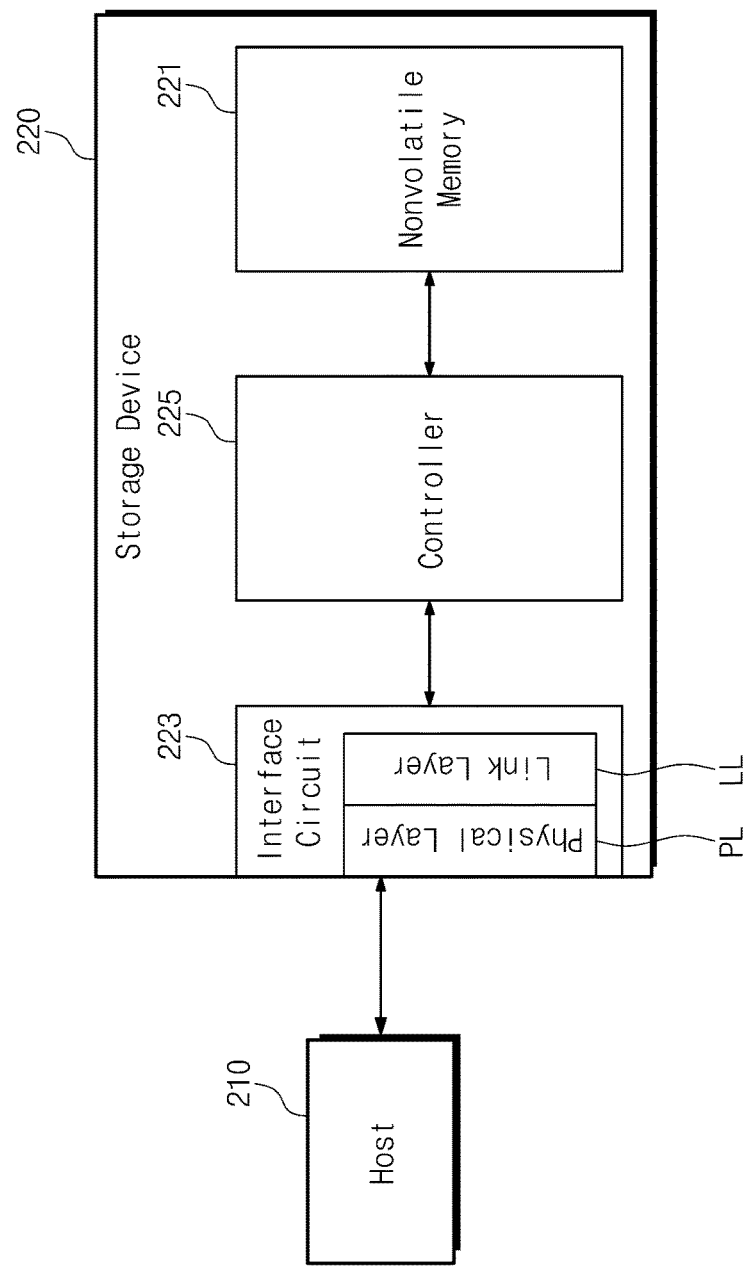
FIG. 13 is a block diagram illustrating a storage system according to an example embodiment.

FIG. 13 is a block diagram illustrating a storage system according to an example embodiment.

Referring to FIG. 13, a storage system 200 may include a host 210 and a storage device 220.

The host 210 may include the first electronic device 110 of FIG. 1. As an example embodiment, the host 210 may include an application processor when the storage system 200 is implemented in a mobile electronic system.

The storage device 220 may include the second electronic device 120 of FIG. 1. The storage device 220 according to an example embodiment may include a nonvolatile memory 221, an interface circuit 223, and a controller 225. The interface circuit 223 may include a physical layer PL and a link layer LL. However, the storage device 220 may further include other components not illustrated in FIG. 13. A configuration illustrated in FIG. 13 is just an example to help understand the example embodiments. Descriptions associated with a configuration of the storage device 220 will be more described with reference to FIGS. 14 and 15.

Figure 14:
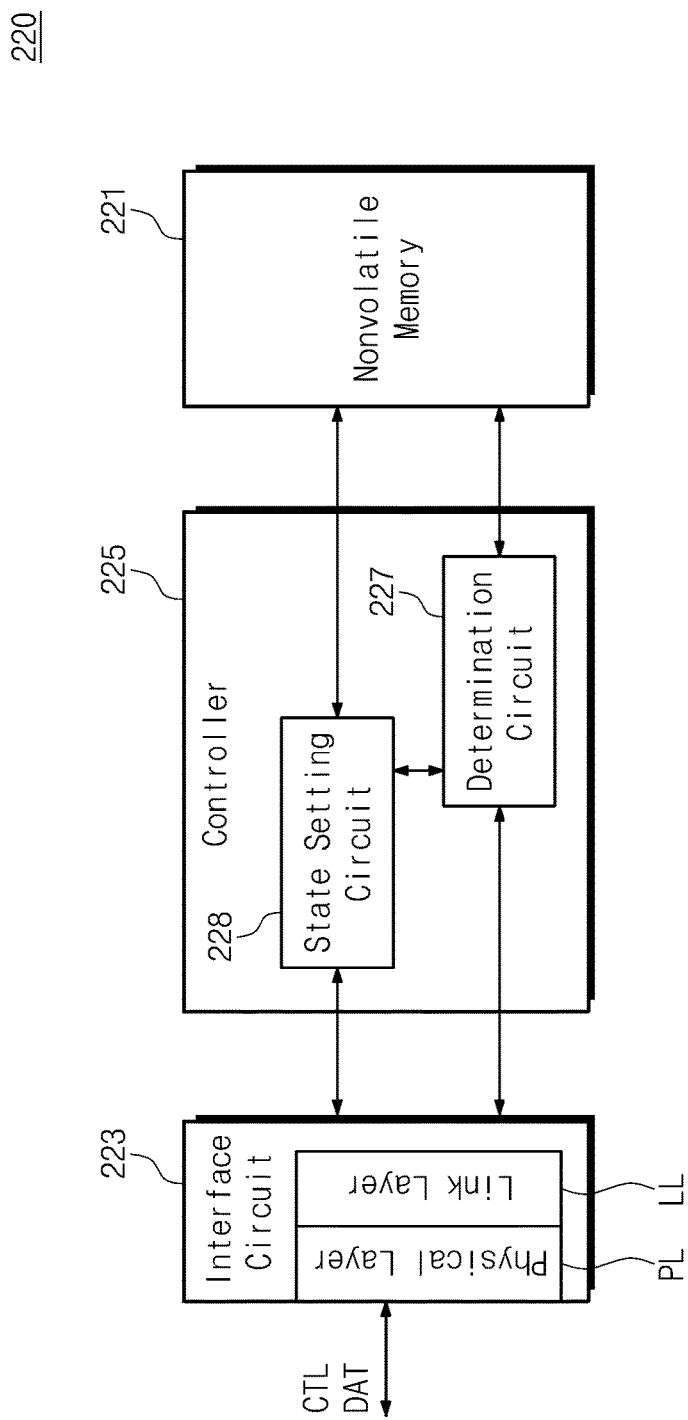
FIG. 14 is a block diagram illustrating a storage device shown in FIG. 13.

FIG. 14 is a block diagram illustrating a storage device shown in FIG. 13.

Referring to FIGS. 13 and 14, the storage device 220 according to an example embodiment may include the nonvolatile memory 221, the interface circuit 223, and the controller 225.

The nonvolatile memory 221 may store data regardless of whether power is supplied. In an example embodiment, the nonvolatile memory 221 may store one or more identification codes ID_CODEs. The one or more identification codes may respectively correspond to one or more linkup states associated with hosts with different attributes (refer to FIG. 6). Detailed descriptions associated with the identification code will be omitted below.

The non-volatile memory may be a Read Only Memory (ROM), a Programmable Read Only Memory (PROM), an Erasable Programmable Read Only Memory (EPROM), or a flash memory.

In some example embodiments, the nonvolatile memory device 221 may be a three dimensional (3D) memory array. The 3D memory array may be monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In some example embodiments, the 3D memory array may include vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

As an example embodiment, a value of each of the one or more identification codes may be directly (i.e., physically or electrically) stored in memory cells of the nonvolatile memory 221. In this example embodiment, a value of each of the one or more identification codes may be directly read from the memory cells. As another example embodiment, a value of each of the one or more identification codes may be stored in the form of software. For instance, a value of each of the one or more identification codes may be inserted in a program instruction. When the program instruction is executed, a value of each of the one or more identification codes may be extracted. As an example embodiment, the program instruction may be firmware or a code stored in a read-only memory (ROM). The program instruction may be stored in the nonvolatile memory 221 as the form of binary data.

Further, in an example embodiment, the nonvolatile memory 221 may further store one or more linkup information. The one or more linkup information may be used to set one or more linkup states, respectively. As an example embodiment, the linkup information may include at least one of information associated with a connection of a lane used for data communications with the host 210, information associated with capability of the physical layer PL, information associated with capability of the link layer LL, and information associated with capability of the host 210. Detailed descriptions associated with the linkup state and the linkup information will be omitted below.

As an example embodiment, data values corresponding to the one or more linkup information may be directly (i.e., physically or electrically) stored in the memory cells of the nonvolatile memory 221. In this example embodiment, the data values corresponding to the one or more linkup information may be directly read from the memory cells. As another example embodiment, the data values corresponding to the one or more linkup information may be stored in the form of software. For instance, the data values corresponding to the one or more pieces of linkup information may be inserted in a program instruction. When the program instruction is executed, the data value corresponding to the one or more linkup information may be extracted. As an example embodiment, the program instruction may be firmware or a code stored in a ROM. The program instruction may be stored in the nonvolatile memory 221 as the form of binary data.

As an example embodiment, the nonvolatile memory 221 may be used as a storage memory that is configured to perform a function of the storage device 220. As another example embodiment, the nonvolatile memory 221 may be a memory that is separately provided from the storage memory. In other words, the one or more identification codes according to an example embodiment may be stored in the storage memory or in the memory that is separately provided from the storage memory.

As an example embodiment, values of the one or more identification codes may be stored in the nonvolatile memory 221 together with the data values corresponding to the one or more linkup information. In this example embodiment, the storage device 220 includes one nonvolatile memory 221. In addition, a particular area of a memory may be allocated to store values of the one or more identification codes and data values corresponding to the one or more linkup information. As another example embodiment, the storage device 220 may be configured to include two or more nonvolatile memories. In this example embodiment, a nonvolatile memory storing values of the one or more identification codes may be different from a nonvolatile memory storing data values corresponding to the one or more linkup information.

The interface circuit 223 according to an example embodiment may include the physical layer PL and the link layer LL. The interface circuit 223 may operate in compliance with the interface protocol using the physical layer PL and the link layer LL. The interface circuit 223 may exchange data DAT with the host 210. The interface circuit 223 may exchange control signals CTL with the host 210. For instance, the control signals CTL may include a power signal, a clock signal, and a reset signal.

As an example embodiment, when the storage device 220 is implemented in a mobile electronic system, the link layer LL may be defined by the UniPro specification, and the physical layer PL may be defined by the M-PHY specification. The physical layer PL may include physical components (e.g., one or more transmitters and one or more receivers) for exchanging data with the host 210. The link layer LL may manage data transmission and composition, and may manage data integrity and error. The link layer LL of the interface circuit 223 may further include a physical adapted layer (not shown).

The controller 225 may include a determination circuit 227 and a state setting circuit 228. The controller 225 may manage and control overall operations of the storage device 220. For example, the controller 225 may process and manage the data exchanged with the host 210 through the interface circuit 223.

As an example embodiment, the controller 225 may control a storage memory in compliance with the UFS interface protocol proposed by the JEDEC. However, example embodiments are not limited thereto. For instance, the controller 225 may control the storage memory in compliance with one or more of various interface protocols, such as universal serial bus (USB), small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), and integrated drive electronics (IDE).

The storage device 220 may perform its own function under a control of the controller 225. For instance, when the nonvolatile memory 221 is used as a storage memory, the controller 225 may store data, which is provided from the host 210 through the interface circuit 223, in the nonvolatile memory 221. Alternatively, the controller 225 may provide data, which is stored in the nonvolatile memory 221, to the host 210 through the interface circuit 223.

As an example embodiment, the controller 225 may sense a connection of the host 210 to the interface circuit 223. The controller 225 may receive an identification code corresponding to an attribute of the host 210. As an example embodiment, the controller 225 may provide a response signal corresponding to the identification code to the host 210. Detailed descriptions associated with the identification code and the response signal will be omitted below.

The determination circuit 227 may determine whether an identification code having the same value as the received identification code is stored in the nonvolatile memory 221. In response to determining that the identification code having the same value as the received identification code is not stored in the nonvolatile memory 221, a value of the received identification code may be stored in the nonvolatile memory 221 according to a control of the controller 225. In order to set an express linkup state, the determination circuit 227 may determine whether target linkup information is stored in the nonvolatile memory 221. The target linkup information is linkup information used to set the express linkup state from among one or more linkup information.

The state setting circuit 228 may set a state of the storage device 220 as the express linkup state. In particular, the state setting circuit 228 may set states of the physical layer PL and the link layer LL as the express linkup state corresponding to the received identification code. The state setting circuit 228 may set states of the physical layer PL and the link layer LL as the express linkup state based on the target linkup information stored in the nonvolatile memory 221. Data communications between the host 210 and the storage device 220 may be activated when the express linkup state is set.

As an example embodiment, if the target linkup information is not stored in the nonvolatile memory 221, the controller 225 may receive lane connection information and capability information of the host 210. However, the example embodiments are not limited thereto. For instance, the controller 225 may receive other information needed to set the express linkup state as well as the lane connection information and the capability information. The state setting circuit 228 may set states of the physical layer PL and the link layer LL as the express linkup state based on the received information. In addition, the received information may be stored in the nonvolatile memory 221 according to a control of the controller 225.

As an example embodiment, the stored identification code and the stored linkup information may be referred to restore the express linkup state. For instance, restoration of the linkup state may be performed when a reconnection of the host 210 to the interface circuit 223 is sensed after the host 210 and the storage device 220 are disconnected, or when an error associated with the set linkup state is detected.

When the linkup state is restored, the controller 225 may receive the identification code corresponding to the attribute of the host 210 again. In addition, the controller 225 may provide the response signal corresponding to the identification code to the host 210. The state setting circuit 228 may restore states of the physical layer PL and the link layer LL to the express linkup state, based on a value of the stored identification code and the stored information (e.g., stored lane connection information and stored capability information).

As an example embodiment, the state setting circuit 228 may directly (i.e., physically or electrically) set states of the physical layer PL and the link layer LL as the express linkup state, based on the target linkup information stored in the nonvolatile memory 221. As another example embodiment, the state setting circuit 228 may set states of the physical layer PL and the link layer LL as the express linkup state by means of a program instruction. For instance, when the controller 225 executes a program instruction in which the target linkup information is inserted, the state setting circuit 228 may extract the target linkup information from the program instruction to set states of the physical layer PL and the link layer LL as the express linkup state.

The storage device 220 may operate according to an example embodiment using the controller 225, the determination circuit 227, and the state setting circuit 228. The storage device 220 may operate according to a procedure described with reference to FIGS. 3 through 12. Redundant descriptions will be omitted below for brevity of the description.

The controller 225 may include a processor and a memory (not shown).

The processor may be an arithmetic logic unit, a digital signal processor, a microcomputer, a field programmable array, a programmable logic unit, a microprocessor or any other device capable of responding to and executing instructions in a defined manner such that the processor is programmed with instructions that configure the controller 225 as a special purpose computer to perform the operations illustrated in one or more of FIGS. 3 to 5, and 7 to 12, such that the controller 225 is configured to allow the interface circuits 223 to form an express link with the host 210. For example, the controller 225 may be configured to instruct the interface circuit 223 to switch to an express linkup state using information stored in the nonvolatile memory 221, if the controller 225 determines that it can setup a link with the host 210 without exchanging lane and capability information with the host 210. Further, the controller 225 may be configured to build a link database in the nonvolatile memory 221 containing the information necessary to perform a express linkup during future connections with the host 210.

A configuration of the controller 225 included in the storage device 220 has been described with reference to FIG. 14. However, referring to example embodiments described with reference to FIGS. 3 through 12, the host 210 may also include a controller that has a configuration and functions similar to those of the controller 225 of the storage device 220. Detailed descriptions associated with the host 210 will be omitted for brevity of the description.

As described above, the storage device 220 may include a storage memory that is configured to perform a function of the storage device 220. As an example embodiment, the nonvolatile memory 221, the interface circuit 223, the controller 225, and the storage memory may be implemented in an embedded storage that is embedded in a mobile electronic system. As another example embodiment, the nonvolatile memory 221, the interface circuit 223, the controller 225, and the storage memory may be implemented in a card storage that is connected with a mobile electronic system. However, example embodiments are not limited thereto. The storage device 220 may be implemented in another type of storage.

Figure 15:
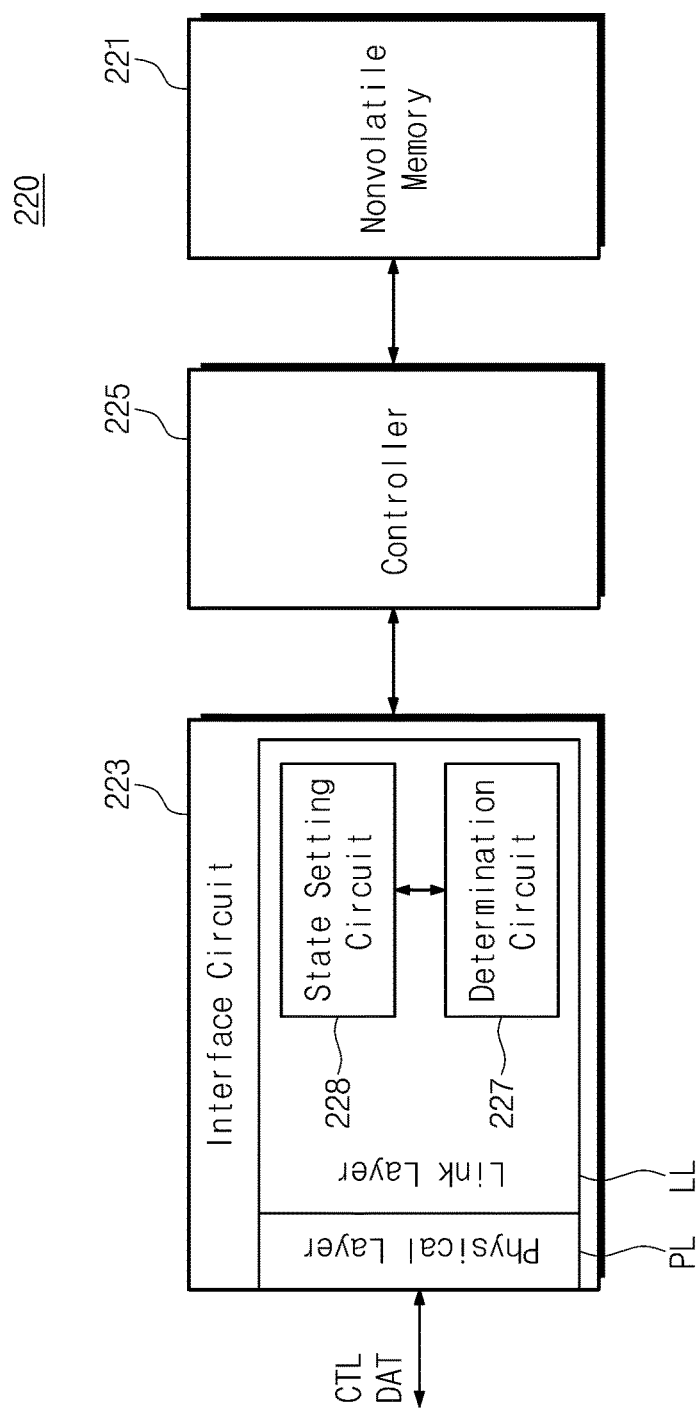
FIG. 15 is a block diagram illustrating a storage device shown in FIG. 13.

FIG. 15 is a block diagram illustrating a storage device shown in FIG. 13.

Referring to FIGS. 13 and 15, the storage device 220 according to an example embodiment may include the nonvolatile memory 221, the interface circuit 223, and the controller 225.

Unlike the storage device 220 illustrated in FIG. 14, as an example embodiment, the determination circuit 227 and the state setting circuit 228 may be included in a link layer LL of the interface circuit 223, not in the controller 225. That is, an example embodiment may be variously modified or changed as necessary. The above-described example embodiments do not intend to limit the example embodiments. Configurations and functions of the nonvolatile memory 221, the interface circuit 223, the controller 225, the determination circuit 227, and the state setting circuit 228 are substantially the same as those described with reference to FIG. 14, and redundant descriptions hereof will be omitted below.

Figure 16:
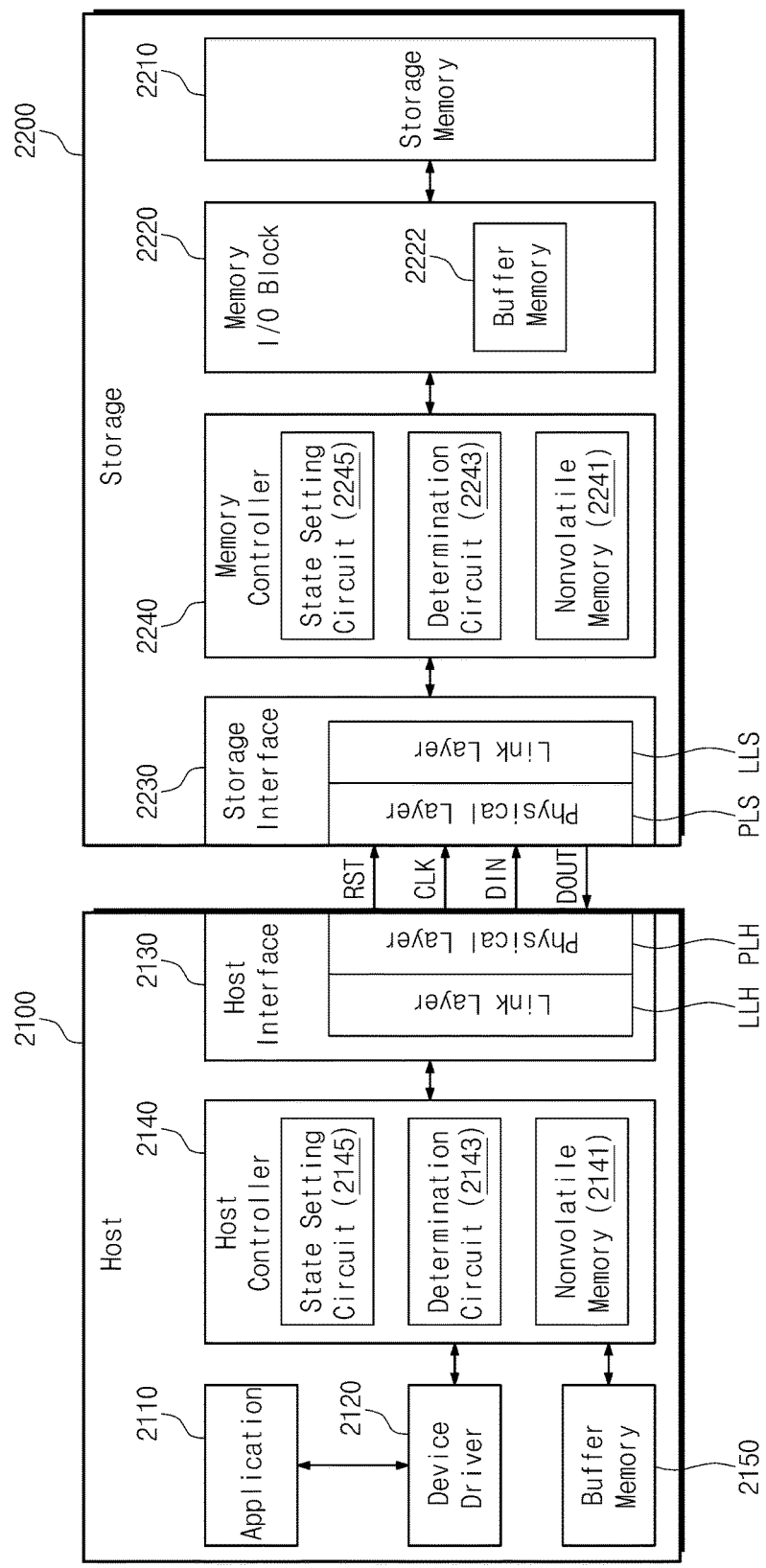
FIG. 16 is a block diagram illustrating a storage system including an embedded storage or a card storage according to an example embodiment.

FIG. 16 is a block diagram illustrating a storage system including an embedded storage or a card storage according to an example embodiment.

Referring to FIG. 16, a storage system 2000 may include a host 2100 and an embedded or card storage 2200 (hereinafter referred to as an "embedded/card storage").

The host 2100 according to an example embodiment may include an application 2110, a device driver 2120, a host interface 2130, a host controller 2140, and a buffer memory 2150. However, example embodiments are not limited thereto. For example, the host 2100 may further include other components that are not shown in FIG. 16. Alternatively, the host 2100 may not include one or more of components shown in FIG. 16.

The application 2110 may manage various kinds of application programs executed on the host 2100. The device driver 2120 may manage and drive peripheral devices connected with the host 2100. In FIG. 16, the device driver 2120 may drive the embedded/card storage 2200. The application 2110 and the device driver 2120 may be implemented in the form of a program instruction, for instance, firmware.

The host interface 2130 may exchange signals (e.g., a reset signal RST and a clock signal CLK) and data (e.g., input data DIN and output data DOUT) with the embedded/card storage 2200. The host interface 2130 may include a physical layer PLH and a link layer LLH. As an example embodiment, the host interface 2130 may communicate with the embedded/card storage 2200 in compliance with the interface protocol using the physical layer PLH and the link layer LLH.

The host controller 2140 may manage and control overall operations of the host 2100. The host controller 2140 may process and manage data exchanged with the embedded/card storage 2200 through the host interface 2130.

In an example embodiment, the host controller 2140 may include a nonvolatile memory 2141, a determination circuit 2143, and a state setting circuit 2145. Configurations and functions of the nonvolatile memory 2141, the determination circuit 2143, and the state setting circuit 2145 may correspond to configurations and functions of the nonvolatile memory 221, the determination circuit 227, and the state setting circuit 228 shown in FIG. 14.

For instance, the nonvolatile memory 2141 may store information of a response signal corresponding to an identification code and linkup information. States of the physical layer PLH and the link layer LLH may be set as an express linkup state according to operations of the determination circuit 2143 and the state setting circuit 2145. The host 2100 may operate according to an example embodiment with the nonvolatile memory 2141, the determination circuit 2143, and the state setting circuit 2145. The host 2100 may operate according to a procedure described with reference to FIGS. 3 through 12. Redundant descriptions will be omitted below.

As illustrated in FIG. 16, the nonvolatile memory 2141, the determination circuit 2143, and the state setting circuit 2145 may be included in the host controller 2140. However, the nonvolatile memory 2141, the determination circuit 2143, and the state setting circuit 2145 may be implemented separately from the host controller 2140. Alternatively, the determination circuit 2143 and the state setting circuit 2145 may be included in the link layer LLH of the host interface 2130. A configuration illustrated in FIG. 16 is an example to help understand the example embodiments, and does not limit the example embodiments.

The buffer memory 2150 may temporarily buffer data processed or to be processed by the host 2100. For instance, the buffer memory 2150 may include a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

The embedded/card storage 2200 according to an example embodiment of the may include a storage memory 2210, a memory input/output block 2220, a storage interface 2230, and a memory controller 2240. However, example embodiments are not limited thereto. For example, the embedded/card storage 2200 may further include other components that are not illustrated in FIG. 16. Alternatively, the embedded/card storage 2200 may not include one or more of components shown in FIG. 16.

The storage memory 2210 is a memory that is configured to perform a function of the embedded/card storage 2200. The storage memory 2210 may store data regardless of whether power is supplied. For instance, the storage memory 2210 may be one of a NAND-type flash memory, a NOR-type flash memory, a PRAM, an MRAM, a ReRAM, and an FRAM. Alternatively, the storage memory 2210 may be implemented with different types of memories.

The memory input/output block 2220 may process writing data in the storage memory 2210 and reading data from the storage memory 2210. The memory input/output block 2220 may include a buffer memory 2222 for buffering data temporarily. For instance, the buffer memory 2222 may include a nonvolatile memory, such as a flash memory, a PRAM, a MRAM, a ReRAM, or a FRAM, or a volatile memory, such as a SRAM, a DRAM, or a SDRAM. Although not shown in FIG. 16, the memory input/output block 2220 may further include other components used to input and output data, such as an address decoder and a sense amplifier.

The storage interface 2230 may exchange signals (e.g., the reset signal RST and the clock signal CLK) and data (e.g., the input data DIN and the output data DOUT) with the host 2100. The storage interface 2230 may include a physical layer PLS and a link layer LLS. The storage interface 2230 may operate in compliance with the interface protocol using the physical layer PLS and the link layer LLS.

The memory controller 2240 may manage and control overall operations of the embedded/card storage 2200. The memory controller 2240 may process and manage the data exchanged with the host 2100 through the storage interface 2230.

In an example embodiment, the memory controller 2240 may include a nonvolatile memory 2241, a determination circuit 2243, and a state setting circuit 2245. Configurations and functions of the nonvolatile memory 2241, the determination circuit 2243, and the state setting circuit 2245 may correspond to configurations and functions of a nonvolatile memory 221, a determination circuit 227, and a state setting circuit 228 shown in FIG. 14.

For instance, the nonvolatile memory 2241 may store an identification code and linkup information. States of the physical layer PLS and the link layer LLS may be set as an express linkup state according to operations of the determination circuit 2243 and the state setting circuit 2245. The embedded/card storage 2200 may operate according to an example embodiment with the nonvolatile memory 2241, the determination circuit 2243, and the state setting circuit 2245. The embedded/card storage 2200 may operate according to a procedure described with reference to FIGS. 3 through 12. Redundant descriptions will be omitted below.

As described with reference to FIG. 16, the nonvolatile memory 2241 may be implemented with a memory that is provided separately from the storage memory 2210. However, the nonvolatile memory 2241 may be implemented in one memory together with the storage memory 2210. In addition, as illustrated in FIG. 16, the determination circuit 2243 and the state setting circuit 2245 may be included in the memory controller 2240. However, the determination circuit 2243 and the state setting circuit 2245 may be implemented with a circuit that is provided separately from the memory controller 2240. Alternatively, the determination circuit 2243 and the state setting circuit 2245 may be included in the link layer LLS of the storage interface 2230. A configuration of the storage system 2000 illustrated in FIG. 16 is an example to help understanding of the example embodiments, and does not limit the example embodiments.

A configuration of a storage device implemented based on an example embodiment has been described with reference to FIG. 16. As described above, however, the example embodiments may be adopted to all interface circuits that use a physical layer and a link layer. FIG. 16 is provided to help understand of the example embodiment, not to limit the example embodiments.

Figure 17:
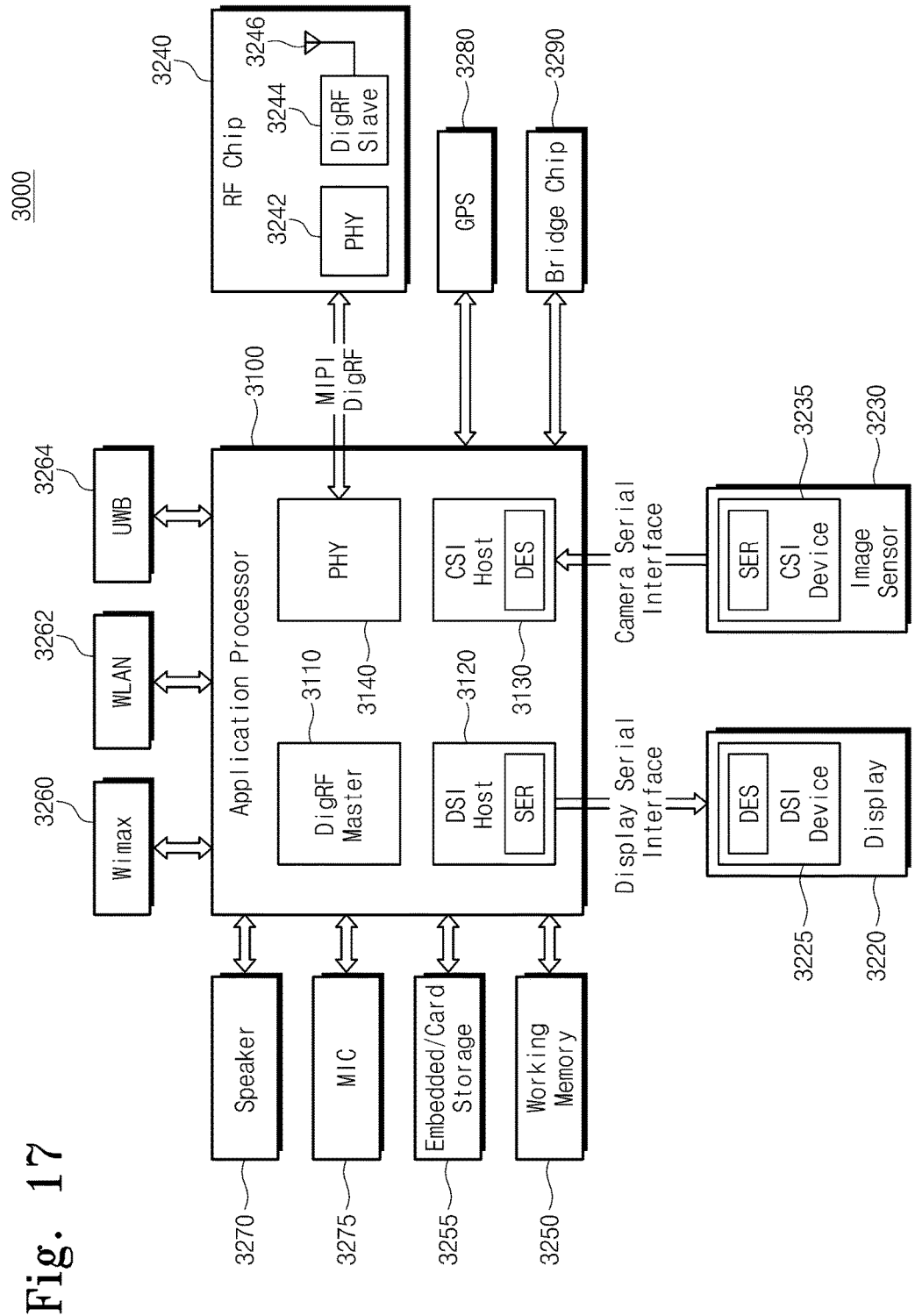
FIG. 17 is a block diagram illustrating an electronic system including a controller according to an example embodiment, and interfaces operating according to an example embodiment.

FIG. 17 is a block diagram illustrating an electronic system including a controller according to an example embodiment, and interfaces operating according to an example embodiment.

Referring to FIG. 17, an electronic system 3000 may be implemented with a data processing device (e.g., a cellular phone, a personal digital assistant (PDA), a portable media player (PMP), a smart phone, or a wearable device) using or supporting an interface proposed by the MIPI Alliance.

The electronic system 3000 may include an application processor 3100, a display 3220, and an image sensor 3230.

The application processor 3100 may include a DigRF master 3110, a display serial interface (DSI) host 3120, a camera serial interface (CSI) host 3130, and a physical layer 3140.

The DSI host 3120 may communicate with a DSI device 3225 of the display 3220 in compliance with DSI. For instance, an optical serializer SER may be implemented in the DSI host 3120, and an optical de-serializer DES may be implemented in the DSI device 3225.

The CSI host 3130 may communicate with a CSI device 3235 of the image sensor 3230 in compliance with CSI. An optical serializer SER may be implemented in the CSI device 3235, and an optical de-serializer DES may be implemented in the CSI host 3130.

DSI and CSI may use a physical layer and a link layer. The DSI and CSI may adopt example embodiments. For instance, the DSI host 3120 and the DSI device 3225 may enter an express linkup state, based on an identification code and linkup information. In addition, the CSI device 3225 and the CSI host 3130 may enter an express linkup state, based on an identification code and linkup information.

The electronic device 3000 may further include a radio frequency (RF) chip 3240 capable of communicating with the application processor 3100. The RF chip 3240 may include a physical layer 3242, a DigRF slave 3244, and an antenna 3246. For instance, data may be exchanged between the physical layer 3242 of the RF chip 3240 and the physical layer 3140 of the application processor 3100 through DigRF interface proposed by the MIPI Alliance. The DigRF interface may adopt example embodiments. For instance, the physical layers 3140 and 3242 may enter an express linkup state, based on an identification code and linkup information.

The electronic system 3000 may further include a working memory 3250 and an embedded/card storage 3255. The working memory 3250 and the embedded/card storage 3255 may store data provided from the application processor 3100. Also, the working memory 3250 and the embedded/card storage 3255 may provide data stored therein to the application processor 3100.

The working memory 3250 may temporarily store data processed or to be processed by the application processor 3100. The working memory 3250 may include a nonvolatile memory, such as a flash memory, a PRAM, a MRAM, a ReRAM, or a FRAM, or a volatile memory, such as a SRAM, a DRAM, or a SDRAM.

The embedded/card storage 3255 may store data regardless of whether power is supplied. As an example embodiment, the embedded/card storage 3255 may operate in compliance with UFS interface protocol. However, example embodiments are not limited thereto. As described with reference to FIGS. 16 and 17, the embedded/card storage 3255 may enter an express linkup state, based on an identification code and linkup information.

The electronic system 3000 may communicate with an external system (not shown) through a world interoperability for microwave access (WiMax) 3260, a wireless local area network (WLAN) 3262, and/or an ultra wideband (UWB) 3264. When the WLAN 3262 operates in compliance with the UniPro and the M-PHY interface protocols, the application processor 3100 and the WLAN 3262 may enter an express linkup state, based on an identification code and linkup information.

The electronic system 3000 may further include a speaker 3270 and a microphone 3275 to process voice information. The electronic system 3000 may further include a global positioning system (GPS) device 3280 for processing position information.

The electronic system 3000 may further include a bridge chip 3290 for managing connections with peripheral devices. When the bridge chip 3290 operates in compliance with the UniPro and the M-PHY interface protocols, the application processor 3100 and the bridge chip 3290 may enter an express linkup state, based on an identification code and linkup information.

Configurations illustrated in each conceptual diagram should be understood from a conceptual point of view. Shape, structure, and size of each component shown in a conceptual diagram are exaggerated or downsized to help understand of the example embodiments. Actually implemented configurations may be different from those of each conceptual diagram. Each conceptual diagram is not intended to limit the physical shape of the component.

A device configuration shown in each block diagram intends to help understanding of the example embodiments. Each block may be formed of smaller blocks according to a function. Alternatively, a plurality of blocks may form a larger unit of block according to functions. That is, the example embodiments are not limited to components shown in each block diagram.

While the example embodiments have been described with reference to example embodiments, it will be apparent to those skilled in the art that various changes and/or modifications may be made without departing from the spirit and scope of the example embodiments. Therefore, it should be understood that the above-mentioned example embodiments are not limiting, but illustrative.

What is claimed is:

1. A method of operating a controller, the method comprising:
    sensing, by the controller, a connection of a first electronic device to an interface circuit of a second electronic device, the second electronic device associated with the controller;
    receiving a received identification code from the first electronic device after the connection of the first electronic device is sensed, the received identification code having a value different from values defined and reserved in an interface protocol, the interface protocol defining an operating procedure of the interface circuit, the value of the received identification code being based on attributes of the first electronic device;
    first determining whether the value of the received identification code corresponds to one of one or more stored identification codes stored in a nonvolatile memory associated with the second electronic device; and
    selectively setting a state of at least a physical layer of the interface circuit as an express linkup state based at least on whether the received identification code corresponds to one of the one or more stored identification codes such that data communication from the second electronic device to the first electronic device is enabled.

2. The method of claim 1, wherein the attributes of the first electronic device comprise:
    a type and a manufacturer of the first electronic device.

3. The method of claim 1, further comprising:
    sending a response signal to the first electronic device based on the received identification code.

4. The method of claim 1, wherein the selectively setting comprises:
    second determining whether linkup information used to set the express linkup state is stored in the nonvolatile memory, if the first determining determines that the value of the received identification code is stored in the nonvolatile memory, the linkup information identifying at least one of the attributes of the first electronic device.

5. The method of claim 4, wherein the linkup information comprises:
    at least one of information associated with a connection of a lane used for the data communication between the first electronic device and the second electronic device, information associated with capabilities of the first electronic device, and information associated with capabilities of the second electronic device.

6. The method of claim 4, wherein the selectively setting further comprises:
setting the state of at least the physical layer of the interface circuit as the express linkup state, if the second determining determines that the linkup information is stored in the nonvolatile memory, the express linkup state being a state where variables for the data communication are set based on the linkup information.

7. The method of claim 4, wherein if the second determining determines that the linkup information is not stored in the nonvolatile memory, then the selectively setting further comprises:
receiving lane connection information and capability information of the first electronic device;
setting the state of at least the physical layer of the interface circuit as the express linkup state, based on the lane connection information and the capability information; and
storing the lane connection information and the capability information in the nonvolatile memory.

8. The method of claim 7, further comprising:
restoring the express linkup state when the first electronic device reconnects to the interface circuit or when an error on the set express linkup state is detected, the restoring including,
receiving the received identification code from the first electronic device; and
setting the state of at least the physical layer of the interface circuit as the express linkup state, based on the lane connection information and the capability information.

9. The method of claim 1, wherein if the first determining determines that the value of the received identification code is not stored in the nonvolatile memory, then the selectively setting comprises:
storing the received identification code in the nonvolatile memory;
receiving lane connection information and capability information of the first electronic device corresponding to the value of the received identification code;
setting the state of at least the physical layer of the interface circuit as the express linkup state, based on the lane connection information and the capability information; and
storing the lane connection information and the capability information in the nonvolatile memory.

10. The method of claim 1, wherein the second electronic device is a storage device, the storage device including the nonvolatile memory and the controller.

11. A method of operating a controller associated with a first electronic device, the method comprising:
sensing a connection of a second electronic device to an interface circuit of the first electronic device;
sending an identification code to the second electronic device as a sent identification code after the connection of the second electronic device is sensed, the sent identification code having a value different from values defined and reserved in an interface protocol such that the second electronic device determines whether the value of the sent identification code received by the second electronic device corresponds to one of one or more stored identification codes stored in a nonvolatile memory associated with the second electronic device, the interface protocol defining an operating procedure of the interface circuit, the value of the identification code being based on attributes of the first electronic device;
waiting a stand-by time to receive a response signal from the second electronic device, the response signal providing an indication to the first electronic device that the second electronic device recognizes the sent identification code as corresponding to one of the one or more stored identification codes stored in the nonvolatile memory associated with the second electronic device; and
selectively setting a state of at least a physical layer of the interface circuit as an express linkup state based on whether the response signal provides the indication that the second electronic device recognizes the sent identification code such that data communication from the first electronic device to the second electronic device is enabled.

12. The method of claim 11, wherein the first electronic device is a host, and the host includes an application processor.

13. A storage device comprising:
a nonvolatile memory configured to store one or more stored identification codes, the one or more stored identification codes having different values depending on attributes of hosts;
an interface circuit configured to exchange data with the hosts, the data being exchanged in compliance with an interface protocol using a physical layer and a link layer; and
a controller configured to,
receive a received identification code from a connecting one of the hosts, if a connection between the connecting host and the interface circuit is sensed, the received identification code corresponding to the attributes of the connecting host,
send a response signal to the connecting host based on the received identification code,
determine whether a value of the received identification code corresponds to one of the one or more stored identification codes stored in the nonvolatile memory, and
set states of the physical layer and the link layer as an express linkup state based on the received identification code such that data communication between the connecting host and the storage device is enabled.

14. The storage device of claim 13, wherein a value of each of the one or more stored identification codes is stored in memory cells of the nonvolatile memory or is in a program instruction stored in the nonvolatile memory.

15. The storage device of claim 13, wherein a value of each of the one or more stored identification codes is different from values defined and reserved in the interface protocol.

16. The storage device of claim 13, wherein the nonvolatile memory is further configured to store linkup information, the linkup information identifying the attributes of the hosts to set the express linkup state,
the hosts are identified based on corresponding identification codes, and
the controller is further configured to determine whether the linkup information is stored in the nonvolatile memory.

17. The storage device of claim 16, wherein
the attributes include at least one of information associated with a connection of a lane used for the data communication with the hosts, information associated with capability of each of the physical layer and the link layer, and information associated with capability of the hosts, and data values corresponding to the linkup information are stored in memory cells of the nonvolatile memory or is in a program instruction stored in the nonvolatile memory.

18. The storage device of claim 17, wherein the controller is further configured to set the states of the physical layer and the link layer as the express linkup state based on the data values.

19. The storage device of claim 13, wherein the controller is configured to control a storage memory in compliance with a joint electron device engineering council (JEDEC) universal flash storage (UFS) standardized interface protocol, and wherein the nonvolatile memory, the interface circuit, the controller, and the storage memory are implemented in one of,
an embedded storage configured to embed in a mobile electronic system, or
a card storage configured to connect to the mobile electronic system.

\* \* \* \* \*